United States Patent
Liu et al.

(10) Patent No.: US 12,476,771 B2
(45) Date of Patent: Nov. 18, 2025

(54) APPARATUS AND METHODS FOR SECONDARY CELL (SCell) ENHANCEMENTS IN WIRELESS COMMUNICATIONS

(71) Applicant: Huawei Technologies Co., Ltd., Shenzhen (CN)

(72) Inventors: Jialing Liu, Palatine, IL (US); Weimin Xiao, Hoffman Estates, IL (US); Qian Cheng, Naperville, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 361 days.

(21) Appl. No.: 18/295,092

(22) Filed: Apr. 3, 2023

(65) Prior Publication Data
US 2023/0239126 A1    Jul. 27, 2023

Related U.S. Application Data

(63) Continuation of application No. PCT/US2021/056886, filed on Oct. 27, 2021.

(60) Provisional application No. 63/108,016, filed on Oct. 30, 2020.

(51) Int. Cl.
*H04W 28/02* (2009.01)
*H04L 5/00* (2006.01)

(52) U.S. Cl.
CPC .......... *H04L 5/0098* (2013.01); *H04L 5/0048* (2013.01)

(58) Field of Classification Search
CPC ..... H04W 76/28; H04W 72/02; H04W 72/21; H04W 36/06; H04W 52/40; H04W 52/08; H04W 24/08; H04W 52/0229; H04L 5/0051
See application file for complete search history.

(56) References Cited

U.S. PATENT DOCUMENTS

2020/0366450 A1\* 11/2020 Kazmi ................. H04L 5/005
2021/0337453 A1\* 10/2021 Gao ..................... H04W 76/18

OTHER PUBLICATIONS

Ericsson, "Reduced Latency SCell Activation", 3GPP TSG RAN WG1 #103, eMeeting, Oct. 26-Nov. 13, 2020, 3 pages.
(Continued)

*Primary Examiner* — Phuoc H Doan
(74) *Attorney, Agent, or Firm* — Slater Matsil, LLP

(57) ABSTRACT

A method and apparatus for triggering activation of a secondary cell (SCell) and activating the SCell is provided. A user equipment (UE) may receive, from a gNB, a SCell activation command indicating the UE to activate a SCell for communications between the UE and the gNB on the SCell, and receive a reference signal (RS) on the SCell. The RS is configured for activation of the SCell. The UE may perform, upon receiving the SCell activation command, SCell activation for activating the SCell based at least on the RS, and send, to the gNB, a report indicating that the SCell is activated for the UE.

20 Claims, 12 Drawing Sheets

(56) References Cited

OTHER PUBLICATIONS

3rd Generation Partnership Project; Technical Specification Group Radio Access Network; NR; Requirements for support of radio resource management (Release 16), 3GPP TS 38.133 V16.5.0 (Sep. 2020); 1608 pages.
"3rd Generation Partnership Project; Technical Specification Group Radio Access Network; NR; Physical layer procedures for control (Release 16)," 3GPP TS 38.213 V16.3.0 (Sep. 2020); 179 pages.
"3rd Generation Partnership Project; Technical Specification Group Radio Access Network; NR; Medium Access Control (MAC) protocol specification (Release 16)," 3GPP TS 38.321 V16.2.1 (Sep. 2020); 154 pages.

* cited by examiner

APPARATUS AND METHODS FOR SECONDARY CELL (SCell) ENHANCEMENTS IN WIRELESS COMMUNICATIONS

CROSS-REFERENCE TO RELATED APPLICATIONS

This application is a continuation of International Application No. PCT/US2021/056886, filed on Oct. 27, 2021, which claims the benefit of U.S. Provisional Application No. 63/108,016, filed on Oct. 30, 2020, which applications are hereby incorporated herein by reference in their entireties.

TECHNICAL FIELD

The present disclosure relates generally to wireless communications, and in particular embodiments, to apparatus and methods for secondary cell (SCell) enhancements in wireless communications.

BACKGROUND

Wireless communication systems include long term evolution (LTE), LTE-A, LTE-A-beyond systems, 5G LTE, 5G New Radio (NR), etc. A modern wireless communication system may include a plurality of NodeBs (NBs), which may also be referred to as base stations, network nodes, communications controllers, cells or enhanced NBs (eNBs), and so on. A NodeB may include one or more network points or network nodes using different radio access technologies (RATs), such as high speed packet access (HSPA) NBs or WiFi access points. A NodeB may be associated with a single network point or multiple network points. A cell may include a single network point or multiple network points, and each network point may have a single antenna or multiple antennas. A network point may correspond to multiple cells operating in multiple component carriers. Generally each component carrier in carrier aggregation is a serving cell, which may either be a primary cell (PCell) or a secondary cell (SCell).

A cell or NodeB may serve a number of users (also commonly referred to as user equipment (UE), mobile stations, terminals, devices, and so forth) over a period of time. A communication channel from a base station to a UE is generally referred to as a downlink (DL) channel, and a transmission from the base station to the UE is a downlink transmission. A communication channel from a UE to a base station is generally referred to as an uplink (UL) channel, and a transmission from the UE to the base station is an uplink transmission.

SUMMARY

Technical advantages are generally achieved, by embodiments of this disclosure which describe apparatus and methods for secondary cell (SCell) enhancements in wireless communications.

According to one aspect of the present disclosure, a method is provided that includes: receiving, by a user equipment (UE) from a gNB, a secondary cell (SCell) activation command indicating the UE to activate a SCell for communications between the UE and the gNB on the SCell; receiving, by the UE from the gNB, a reference signal (RS) on the SCell, wherein the RS is configured for activation of the SCell; performing, by the UE upon receiving the SCell activation command, SCell activation for activating the SCell based at least on the RS; and sending, by the UE to the gNB, a report indicating that the SCell is activated for the UE.

Optionally, in any of the preceding aspects, the SCell activation command is received in a medium access control control element (MAC CE) on an activated cell serving the UE, the activated cell different from the SCell.

Optionally, in any of the preceding aspects, transmission of the RS is triggered by a triggering command sent on the activated cell, and the triggering command is included in the MAC CE.

Optionally, in any of the preceding aspects, the RS is one of a set of RSs configured for activation of the SCell, and is indicated by the triggering command.

Optionally, in any of the preceding aspects, wherein the RS is an aperiodic RS and triggered/sent during activation of the SCell, and a slot in which the RS is sent is determined in accordance with a slot in which the SCell activation command is sent and an slot offset value signaled to the UE.

Optionally, in any of the preceding aspects, the UE performs, based on the RS, at least one of AGC settling, frequency tracking, time tracking, or fine timing.

Optionally, in any of the preceding aspects, the RS comprises at least a CSI-RS for tracking or a tracking reference signal (TRS) configured for the SCell.

Optionally, in any of the preceding aspects, transmission of the RS comprises one or more transmissions of the TRS on one or more slots.

Optionally, in any of the preceding aspects, the method further comprises receiving, by the UE after receiving the RS, a channel state information-reference signal (CSI-RS) configured for the SCell.

Optionally, in any of the preceding aspects, the CSI-RS is associated with the RS.

Optionally, in any of the preceding aspects, the CSI-RS is quasi-colocated (QCLed) with the RS.

Optionally, in any of the preceding aspects, the report comprises a CSI report based on a measurement of a CSI-RS, the CSI report comprising a valid channel quality indicator (CQI) indicating that the SCell is activated.

Optionally, in any of the preceding aspects, the method further comprises sending, by the UE to the gNB, a message acknowledging receipt of the SCell activation command.

Optionally, in any of the preceding aspects, the method further comprises activating, by the UE, a bandwidth part (BWP) of the SCell associated with the RS.

Optionally, in any of the preceding aspects, the report indicates that a BWP of the SCell associated with the RS is active.

According to another aspect of the present disclosure, a method is provided that includes: sending, by a gNB to a user equipment (UE), a secondary cell (SCell) activation command indicating the UE to activate a SCell for communications between the UE and the gNB on the SCell; sending, by a gNB to the UE, a reference signal (RS) on the SCell to be activated by the UE, the RS configured for activation of the SCell; and receiving, by the gNB from the UE in response to sending the SCell activation command and the RS, a report indicating that the SCell is activated for the UE.

Optionally, in any of the preceding aspects, the method further comprises determining, by the gNB, to activate the SCell that has been deactivated for the UE.

Optionally, in any of the preceding aspects, the SCell activation command is sent in a medium access control control element (MAC CE) on an activated cell serving the UE, the activated cell different from the SCell.

Optionally, in any of the preceding aspects, the method further comprises sending, by the gNB, a triggering command on the activated cell triggering transmission of the temporary RS, the triggering command is included in the MAC CE.

Optionally, in any of the preceding aspects, the RS is one of a set of RSs configured for activation of the SCell, and is indicated by the triggering command.

Optionally, in any of the preceding aspects, the RS is an aperiodic RS and triggered/sent during activation of the SCell.

Optionally, in any of the preceding aspects, the RS comprises at least a CSI-RS for tracking or a tracking reference signal (TRS) configured for the SCell.

Optionally, in any of the preceding aspects, transmission of the RS comprises one or more transmissions of the TRS on one or more slots.

Optionally, in any of the preceding aspects, the method further comprises sending, by the gNB after sending the RS, a channel state information-reference signal (CSI-RS) configured for the SCell.

Optionally, in any of the preceding aspects, the CSI-RS is associated with the RS.

Optionally, in any of the preceding aspects, the CSI-RS is quasi-colocated (QCLed) with the RS.

Optionally, in any of the preceding aspects, the report comprises a CSI report based on a measurement of a CSI-RS, the CSI report comprising a valid channel quality indicator (CQI) indicating that the SCell is activated.

Optionally, in any of the preceding aspects, the report indicates that a BWP of the SCell associated with the RS is active.

Optionally, in any of the preceding aspects, the method further comprises receiving, by the gNB to the UE, a message acknowledging receipt of the SCell activation command.

According to another aspect of the present disclosure, a method is provided that includes: receiving, by a user equipment (UE) from a gNB, a reference signal (RS) trigger triggering communication of a reference signal (RS) over a secondary cell (SCell); receiving, by the UE from the gNB, the RS on the SCell, the RS being configured for activation of the SCell; performing, by the UE upon receiving the RS trigger, cell activation for activating the SCell using the RS; and sending, by the UE to the gNB, a report indicating that the SCell is activated for the UE.

Optionally, in any of the preceding aspects, the RS trigger is received on an activated cell serving the UE, the activated cell different than the SCell.

Optionally, in any of the preceding aspects, the RS trigger is received in downlink control information (DCI).

Optionally, in any of the preceding aspects, the RS is a tracking reference signal (TRS) configured for the SCell, a channel state information-reference signal (CSI-RS) configured for activation of the SCell, or a sounding reference signal (SRS) configured for the SCell.

Optionally, in any of the preceding aspects, the method further comprises receiving, by the UE from the gNB, a RS during the cell activation of the SCell, the RS being QCLed with the RS.

Optionally, in any of the preceding aspects, the report comprises a CSI report based on a measurement of a CSI-RS, the CSI report comprising a valid channel quality indicator (CQI) indicating that the SCell is activated.

Optionally, in any of the preceding aspects, the report indicates that a BWP of the SCell associated with the RS is active.

According to another aspect of the present disclosure, a method is provided that includes: sending, by a gNB to a user equipment (UE), a reference signal (RS) trigger triggering communication of a reference signal (RS) over a secondary cell (SCell) to be activated for the UE; communicating, by the gNB with the UE, the temporary RS on the SCell, the RS configured for activation of the SCell; and receiving, by the gNB from the UE in response to sending the RS trigger and communication of the RS, a report indicating that the SCell is activated for the UE.

Optionally, in any of the preceding aspects, the method further comprises determining, by the gNB, to activate the SCell that has been deactivated for the UE.

Optionally, in any of the preceding aspects, the RS trigger is sent on an activated cell serving the UE, the activated cell different than the SCell.

Optionally, in any of the preceding aspects, the RS trigger is sent in downlink control information (DCI).

Optionally, in any of the preceding aspects, the RS is a tracking reference signal (TRS) configured for the SCell, a channel state information-reference signal (CSI-RS) configured for activation of the SCell, or a sounding reference signal (SRS) configured for the SCell.

Optionally, in any of the preceding aspects, the method further comprises sending, by the gNB to the UE, a RS during the cell activation of the SCell, the RS being QCLed with the RS.

Optionally, in any of the preceding aspects, the report comprises a CSI report based on a measurement of a CSI-RS, the CSI report comprising a valid channel quality indicator (CQI) indicating that the SCell is activated.

Optionally, in any of the preceding aspects, the report indicates that a BWP of the SCell associated with the RS is active.

According to another aspect of the present disclosure, an apparatus is provided that includes: a non-transitory memory storage comprising instructions; and one or more processors in communication with the memory storage, wherein the instructions, when executed by the one or more processors, cause the apparatus to perform a method according to any of the preceding aspects.

According to another aspect of the present disclosure, a non-transitory computer-readable media is provided, the non-transitory computer-readable media storing computer instructions, that when executed by one or more processors of an apparatus, cause the apparatus to perform a method according to any of the preceding aspects.

The aspects of the present disclosure have advantages of reducing SCell activation latency, and providing enhancements to SCell communications. With reduced SCell activation latency, a SCell may be put into usage as soon as traffic data arrives, so that the user experience can be significantly improved in communicating data. The reduced activation latency can also reduce power consumption of a UE. A UE may be configured with a larger number of SCells in deactivated state so that the power consumption of the UE may be generally minimized, where some or all the SCells may be deactivated and then activated any time when needed to provide high-speed communications. The network and UEs can achieve a better balance between better user experience and reduced energy consumption.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1A:
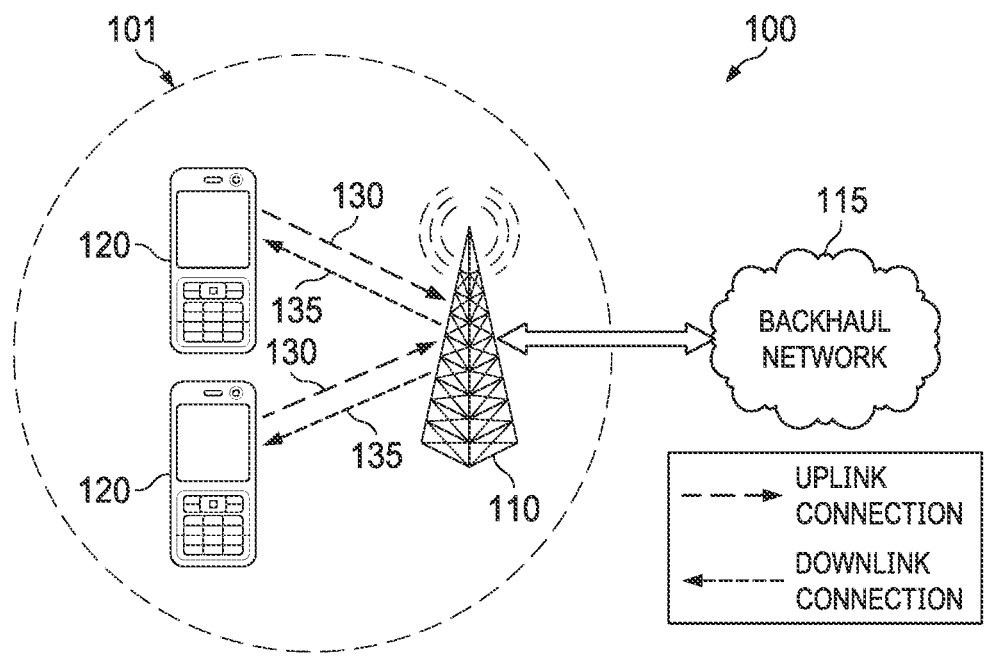
FIG. 1A is a diagram illustrating an example wireless communication system.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Embodiments of the present disclosure provide methods and apparatuses for secondary cell (SCell) enhancements in wireless communications. According to some embodiments, methods for SCell activation triggering and SCell activation are provided. A deactivated SCell of a user equipment (UE) may be activated so that the UE may communicate with a network on the activated SCell. Latency resulted from activating a SCell may impact communication performance, user experience, and user power consumption, and it is thus desirable to reduce the SCell activation latency. Generally, SCell activation latency may be caused by various factors/situations, which may include, e.g., information of the to-be-activated SCell is unknown to the UE (latency may be caused by processing to make the to-be-activated SCell to be known by the UE), or functionalities that are required to by performed during SCell activation, such as AGC settling, time/frequency tracking, channel state information (CSI) measurement/acquisition, and so on.

The embodiments consider transmission of one or more reference signals during a SCell activation procedure, and based on the one or more reference signals, the UE and the network can acquire necessary information for SCell activation. The one or more reference signals may include a tracking reference signal (TRS), a channel state information-reference signal (CSI-RS), a synchronization signal block (SSB), a sounding reference signal (SRS), or a combination thereof. A SCell activation command or a reference signal trigger may be sent to a UE to trigger activation of a SCell for the UE. One or more reference signals may also be sent to the UE during activation of the SCell. The UE may perform SCell activation using the one or more reference signals. The embodiments reduce SCell activation latency, and provide enhancements to SCell communications. In particular, with reduced SCell activation latency, a SCell can be put into usage as soon as bursty traffic data arrives, so that the user experience can be significantly improved in receiving data. The reduced activation latency per se can also reduce power consumption of a UE. Further, a UE may be configured with a larger number of SCells in deactivated state so that the power consumption of the UE may be generally minimized, where some or all the SCells may be "stand by" (deactivated) and may be utilized any time when needed to provide high-speed communications. In this way, the network and UEs can achieve a better balance between better user experience and reduced energy consumption.

In some embodiments, a UE may receive, from a gNB, a SCell activation command indicating the UE to activate a SCell for communications between the UE and the gNB on the SCell. The UE may also receive a temporary reference signal (RS) on the SCell. The temporary RS is configured for activation of the SCell. The UE may perform, upon receiving the SCell activation command, SCell activation for activating the SCell based at least on the temporary RS. The UE may send, to the gNB, a report indicating that the SCell is activated for the UE.

In some embodiments, a UE may receive a reference signal (RS) trigger triggering communication of a temporary reference signal (RS) over a secondary cell (SCell). The temporary RS is configured for activation of the SCell. The UE may perform, upon receiving the RS trigger, cell activation for activating the SCell based on the temporary RS and send, a report indicating that the SCell is activated for the UE.

FIG. 1A illustrates an example wireless communication system 100.

Communication system 100 includes a base station 110 with coverage area 101. The base station 110 serves a plurality of user equipments (UEs), including UEs 120. Transmissions from the base station 110 to a UE is referred to as a downlink (DL) transmission and occurs over a downlink channel (shown in FIG. 1 as a solid arrowed line 135), while transmissions from a UE to the base station 110 is referred to as an uplink (UL) transmission and occurs over an uplink channel (shown in FIG. 1 as a dashed arrowed line 130). Data carried over the uplink/downlink connections may include data communicated between the UEs 120, as well as data communicated to/from a remote-end (not shown) by way of a backhaul network 115. Example uplink channels and signals include physical uplink shared channel (PUSCH), physical uplink control channel (PUCCH), an uplink sounding reference signal (SRS), or physical random access channel (PRACH). Services may be provided to the plurality of UEs by service providers connected to the base station 110 through the backhaul network 115, such as the Internet. The wireless communication system 100 may include multiple distributed access nodes 110.

In a typical communication system, there are several operating modes. In a cellular operating mode, communications to and from the plurality of UEs go through the base station 110, while in device to device communications mode, such as proximity services (ProSe) operating mode, for example, direct communication between UEs is possible. As used herein, the term "base station" refers to any component (or collection of components) configured to provide wireless access to a network. Base stations may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, access nodes, access points (APs), transmission points (TPs), transmission-reception points (TRPs), cells, carriers, macro cells, femtocells, pico cells, relays, customer premises equipment (CPE), the network side, the network, and so on. In the present disclosure, the terms "base station" and "TRP" are used interchangeably unless otherwise specified. As used herein, the term "UE" refers to any component (or collection of components) capable of establishing a wireless connection with a base station. UEs may also be commonly referred to as mobile stations, mobile devices, mobiles, terminals, user terminals, users, subscribers, stations, communication devices, CPEs, relays, Integrated Access and Backhaul (IAB) relays, and the like. It is noted that when relaying is used (based on relays, picos, CPEs, and so on), especially multi-hop relaying, the boundary between a controller and a node controlled by the controller may become blurry, and a dual node (e.g., either the controller or the node controlled by the controller) deployment where a first node that provides configuration or control information to a second node is considered to be the controller. Likewise, the concept of UL and DL transmissions can be extended as well.

A cell may include one or more bandwidth parts (BWPs) for UL or DL allocated for a UE. Each BWP may have its own BWP-specific numerology and configuration, such as the BWP's bandwidth. It is noted that not all BWPs need to be active at the same time for the UE. A cell may correspond to one carrier, and in some cases, multiple carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary UL (non-SUL, or simply UL) carrier which has an associated DL, and other carriers are called supplementary UL (SUL) carriers which do not have an associated DL. A cell, or a carrier, may be configured with slot or subframe formats comprised of DL and UL symbols, and that cell or carrier is seen as operating in a time division duplexed (TDD) mode. In general, for unpaired spectrum, the cells or carriers are in TDD mode, and for paired spectrum, the cells or carrier are in a frequency division duplexed (FDD) mode. A transmission time interval (TTI) generally corresponds to a subframe (in LTE) or a slot (in NR). Access nodes may provide wireless access in accordance with one or more wireless communication protocols, e.g., long term evolution (LTE), LTE advanced (LTE-A), 5G, 5G LTE, 5G NR, future 5G NR releases, 6G, High Speed Packet Access (HSPA), Wi-Fi 802.na/b/g/n/ac, etc. While it is understood that communication systems may employ multiple access nodes (or base stations) capable of communicating with a number of UEs, only one access node, and two UEs are illustrated in FIG. 1A for simplicity.

A way to increase the network resources is to utilize more usable spectrum resources, which include not only the licensed spectrum resources of the same type as the macro, but also the licensed spectrum resources of different type as the macro (e.g., the macro is a FDD cell but a small cell may use both FDD and TDD carriers), as well as unlicensed spectrum resources and shared-licensed spectrums; some of the spectrum resources lie in high-frequency bands, such as 6 GHz to 60 GHz. The unlicensed spectrums can be used by generally any user, subject to regulatory requirements. The shared-licensed spectrums are also not exclusive for an operator to use. Traditionally, the unlicensed spectrums are not used by cellular networks as it is generally difficult to ensure quality of service (QoS) requirements. Operating on the unlicensed spectrums mainly include wireless local area networks (WLAN), e.g., the Wi-Fi networks. Due to the fact that the licensed spectrum is generally scarce and expensive, utilizing the unlicensed spectrum by the cellular operator may be considered. Note that on high-frequency bands and unlicensed/shared-licensed bands, typically TDD is used and hence the channel reciprocity can be exploited for the communications.

In a realistic deployment, a gNB may control one or more cells. Multiple remote radio units may be connected to the same base band unit of the gNB by fiber cable, and the latency between base band unit and remote radio unit is quite small. Therefore, the same base band unit can process the coordinated transmission/reception of multiple cells. For example, the gNB may coordinate the transmissions of multiple cells to a UE, which is called coordinated multiple point (CoMP) or multi-TRP (mTRP, M-TRP) transmission. The gNB may also coordinate the reception of multiple cells from a UE, which is called CoMP/M-TRP reception. In this case, the backhaul link between these cells with the same gNB is fast backhaul and the scheduling of data transmitted in different cells for the UE can be easily coordinated in the same gNB. The backhaul connections may also be ones with longer latency and lower transmission rates.

Figure 1B:
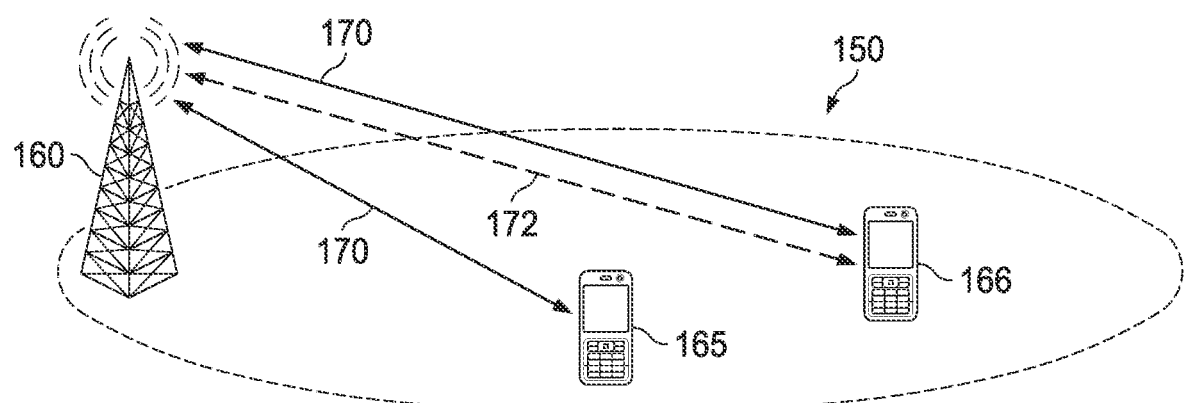
FIG. 1B is a diagram illustrating example use of carrier aggregation (CA)

FIG. 1B illustrates example use of carrier aggregation (CA), which is another deployment strategy. As shown in FIG. 1B, a system 150 is a typical wireless network configured with carrier aggregation (CA) where communications controller 160 communicates to wireless device 165 using wireless link 170 (solid line) and to wireless device 166 using wireless link 172 (dashed line) and using wireless link 170, respectively. In some example deployments, for wireless device 166, the carrier used by wireless link 170 can be called a primary component carrier (PCC), while the carrier used by wireless link 172 can be called a secondary component carrier (SCC). In some carrier aggregation deployments, the PCC can carry feedback from a UE device to a communications controller while the SCC can only carry data traffic. In the 3GPP specifications, a component carrier is called a cell. When multiple cells are controlled by a same eNB, cross scheduling of multiple cells can be implemented and there may be a single scheduler in the same eNB to schedule the multiple cells. With CA, one eNB may operate and control several component carriers forming primary cell (Pcell) and secondary cell (Scell).

Figure 2A:
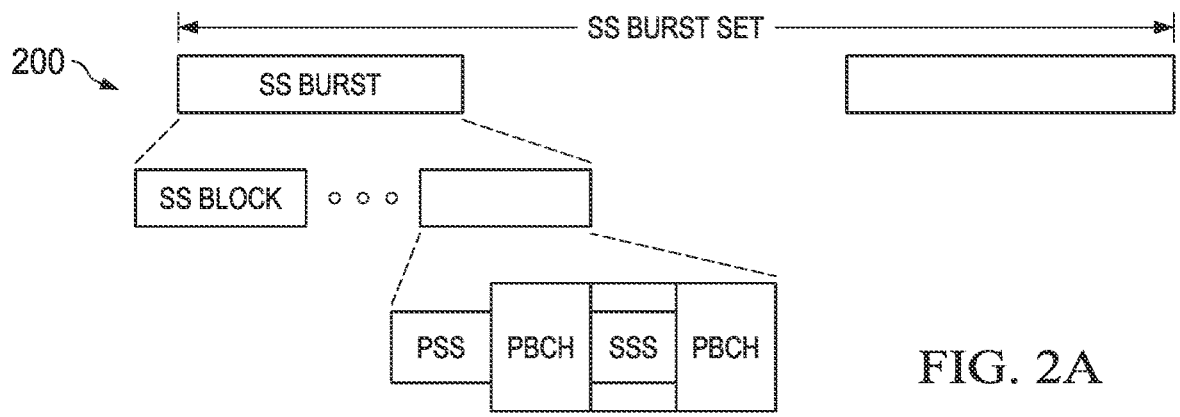
FIG. 2A is a diagram illustrating example physical layer channels and signals.
Figure 2B:
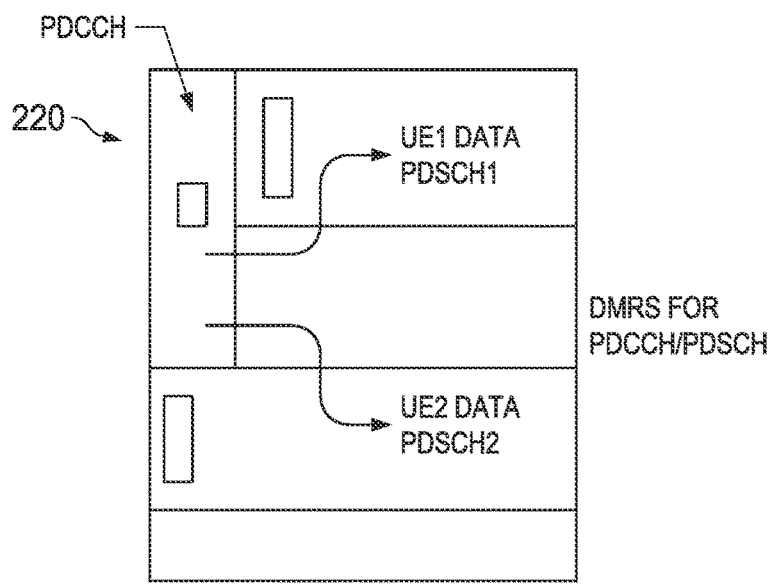
FIG. 2B is a diagram illustrating example channels and signals multiplexed for more than one UE.
Figure 2C:
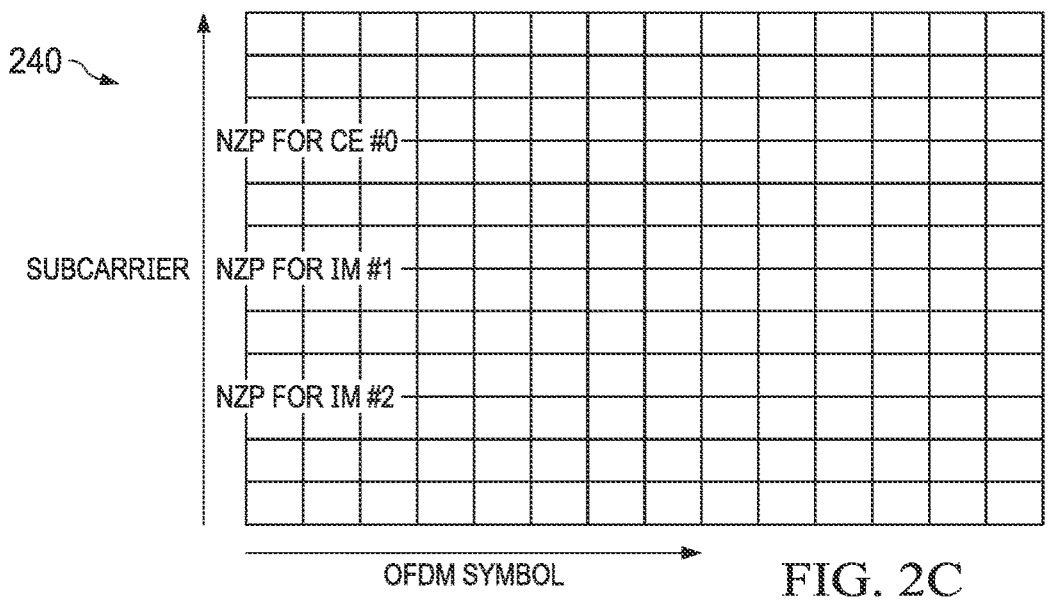
FIG. 2C is a diagram illustrating example non-zero power (NZP) CSI-RSs used for channel estimation and interference measurement.

FIG. 2A is a diagram 200 illustrating example physical layer channels and signals, which may include primary synchronization signal/secondary synchronization signal (PSS/SSS), physical broadcast channel (PBCH) and its associated demodulation reference signal (DMRS). The PSS/SSS/PBCH and associated DMRS form a SSB. FIG. 2B is a diagram 220 illustrating example channels and signals multiplexed for more than one UE. FIG. 2C is a diagram 240 illustrating example non-zero power (NZP) channel state information-reference signals (CSI-RSs) used for, e.g., channel estimation and interference measurement. The CSI-RSs may be multiplexed with PDSCH and for one or more UEs. Physical layer channels and signals may include PSS/SSS, PBCH and its associated DMRS (see FIG. 2A, in which a SS burst is embedded, i.e., multiplexed, with PBCHs around it), physical downlink shared channel (PDSCH) and its associated DMRS and phase tracking reference signal (PT-RS), physical downlink control channel (PDCCH) and its associated DMRS (see FIG. 2B for some of these signals/channels, which are multiplexed for more than one UE), and CSI-RS which may further include those CSI-RS used for CSI acquisition, for beam management, and for tracking (see FIG. 2C for some examples of NZP CSI-RS used for channel estimation, interference measurement, and so on, which are multiplexed with PDSCH and for one or more UEs). The CSI-RS for tracking is also called tracking reference signal (TRS).

A UE receives timing advance (TA) commands associated with the configured TA group (TAG) to adjust its uplink transmission timing to synchronize with the network for uplink transmission so that uplink transmissions from multiple UEs arrive at the base station at about the same time in a transmission time interval (TTI). Likewise, the UE needs to receive DL reference signals (RS) or synchronization signal (SS) blocks, also called SS/PBCH block (SSB) to acquire and maintain the DL synchronization, such as via maintaining a DL timing tracking loop, based on which the UE places the start of its FFT window inside the cyclic prefix (CP) for its DL reception. In addition, both UL and DL signals/channels need to be associated with some other signals for deriving the signal/channel properties, such as delay spread, Doppler shift, etc. DL timing, often called time synchronization, may include rough timing/coarse timing and fine timing, though sometimes they are not clearly differentiated. Rough timing is about roughly when a certain slot/symbol may occur, and fine timing is usually about when a first arriving path starts or where the receiver fast Fourier transform (FFT) window starts.

In wireless communications operations, tracking functionalities performed by a UE may include fine time tracking, fine frequency tracking, delay spread estimation and Doppler spread estimation.

In fine time tracking, a UE may detect a first arriving path, and based thereon, the UE may generally optimally place its FFT window to maximize a data signal to noise plus inter-symbol interference ratio. In a continuous operation, a FFT window position may drift due to UE mobility and a residual oscillator error between a transmitter and a receiver. The UE may adjust its FFT window position based on a detected change of path arriving time.

In fine frequency tracking, a UE may detect a frequency offset between a transmitter and a receiver, and adjust its oscillator accordingly. A residual frequency error may be estimated and compensated in the demodulation of data symbols. The residual frequency error compensation may be very critical, especially in the case of high signal-to-noise ratio (SNR) and high code rate data transmissions. Uncompensated frequency error may impose phase error on modulated data symbols and result in decoding performance degradation. Because temperature change affects output precision of an oscillator and Doppler shift caused by UE movement, a UE may periodically track the frequency offset and apply corresponding adjustment and compensation.

Delay spread determines how dispersive a wireless multi-path channel that a UE experiences is. The longer the delay spread, the more frequency selective the channel is. To generally maximize processing gains along the frequency domain in channel estimation based on received pilot signals, the UE may apply linear filtering with a length as long as possible if within the coherent bandwidth of the channel. Coherent bandwidth is inversely proportion to channel selectiveness. Thus, delay spread estimation plays an important role in forming channel estimation filter coefficients and length, hence affecting the performance of channel estimation and data demodulation.

Doppler spread is usually proportional to UE movement speeds and multi-path spatial distribution. Larger Doppler spread corresponds to a faster changing wireless multi-path fading channel. Channel estimation usually applies filtering in the time domain with longer filter length to suppress noise plus interference if within the channel coherent time constraint. Doppler spread estimation is thus another factor along the time domain affecting UE channel estimation performance.

The quasi co-location (QCL) types corresponding to each DL RS (more specifically, the port(s) or antenna port(s) of the DL RS) are given by the higher layer parameter qcl-Type in QCL-Info and may take one of the following values: 1)'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. The QCL types may be configured/indicated in transmission configuration indication (TCI) states for a RS. The QCL assumptions are mainly used for DL RS, but can be generalized for UL RS if the association via pathloss RS and spatial relation are specified. The QCL assumption of a RS, e.g., RS1, may be specified as: {RS1: QCL Type C to RS2}, {RS1: QCL Type C to RS2 and QCL Type D to RS3}. Then RS1 (sometimes referred to as a target or destination RS) derives the properties specified according to the QCL types from the associated RSs (sometimes referred to as source RSs, e.g., RS2). Note that the source RS may be a SSB. Note also that the source RS and destination RS may be on the same carrier or different carriers (i.e., cross-carrier QCL).

Figure 3:
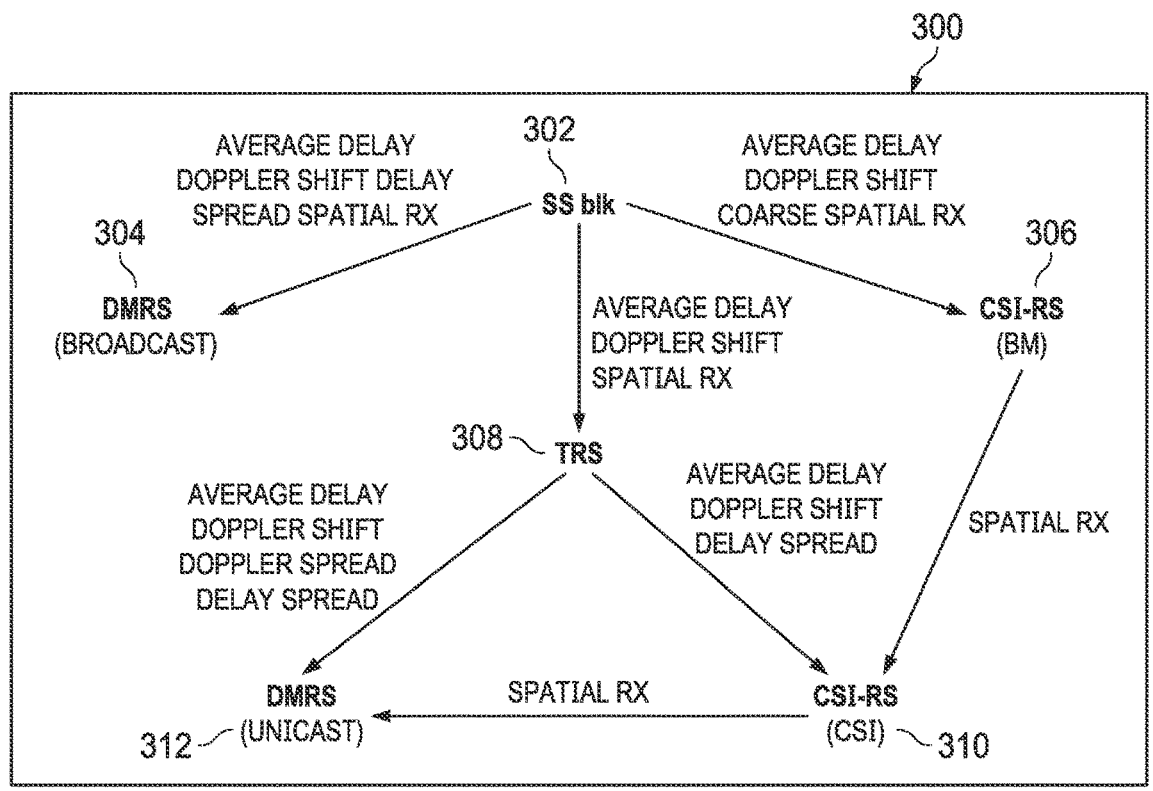
FIG. 3 is a diagram illustrating QCL assumptions among NR reference signals when wide beams are used for communications.

FIG. 3 is a diagram 300 showing QCL assumptions among new radio (NR) reference signals when wide beams are used for communications. For example, a TRS, a SS block or a broadcast DMRS may be transmitted using a wide beam. FIG. 3 shows QCL configurations among a SS block 302, a DMRS 304, a CSI-RS 306, a TRS 308, a CSI-RS 310 and a DMRS 312. The DMRS 304 is for a broadcast channel. That is, the DMRS 304 is a DMRS used for demodulation of a system information block (SIB), radio resource control (RRC) signaling, paging, and etc. before a TRS is configured. The CSI-RS 306 is transmitted for beam forming. The CSI-RS 310 is transmitted for channel estimation. The DMRS 312 is used for demodulation of signals transmitted in a unicast channel. An arrow starting from a first reference signal (e.g., the SS block 302) and ending at a second reference signal (e.g., the DMRS 304) indicates that the second reference signal has a QCL relationship with the first reference signal with respect to one or more QCL parameters. The one or more QCL parameters (e.g., an average delay, a Doppler shift, a delay spread, and a spatial RX) are shown on the arrow, indicating that the one or more QCL parameters required by the second reference signal may be derived using the first reference signal.

As shown, the DMRS 304 is configured to have a QCL relationship with the SS block 302. The average delay, Doppler shift, delay spread, and spatial RX for the DMRS 304 may be derived based on the SS block 302. Similarly, the CSI-RS 306 and the TRS 308 has a QCL relationship with the SS block 302, respectively. An average delay, a Doppler shift, and a coarse spatial RX required by the CSI-RS 306 may be derived based on the SS block 302. An average delay, a Doppler shift, and a spatial RX required by the TRS 308 may be derived from the SS block 302. The CSI-RS 310 has a QCL relationship with the CSI-RS 306 and the TRS 308, respectively. The CSI-RS 310 may be received using a spatial RX derived based on the CSI-RS 306, and use an average delay, a Doppler shift, and a delay spread from the TRS 308. The DMRS 312 has a QCL relationship with the TRS 308 and the CSI-RS 310, respectively. The DMRS 312 may be received using a spatial RX derived based on the CSI-RS 310. The DMRS 312 may also be received an average delay, a Doppler shift, a Doppler spread and a delay spread derived based on the TRS 308.

Figure 4:
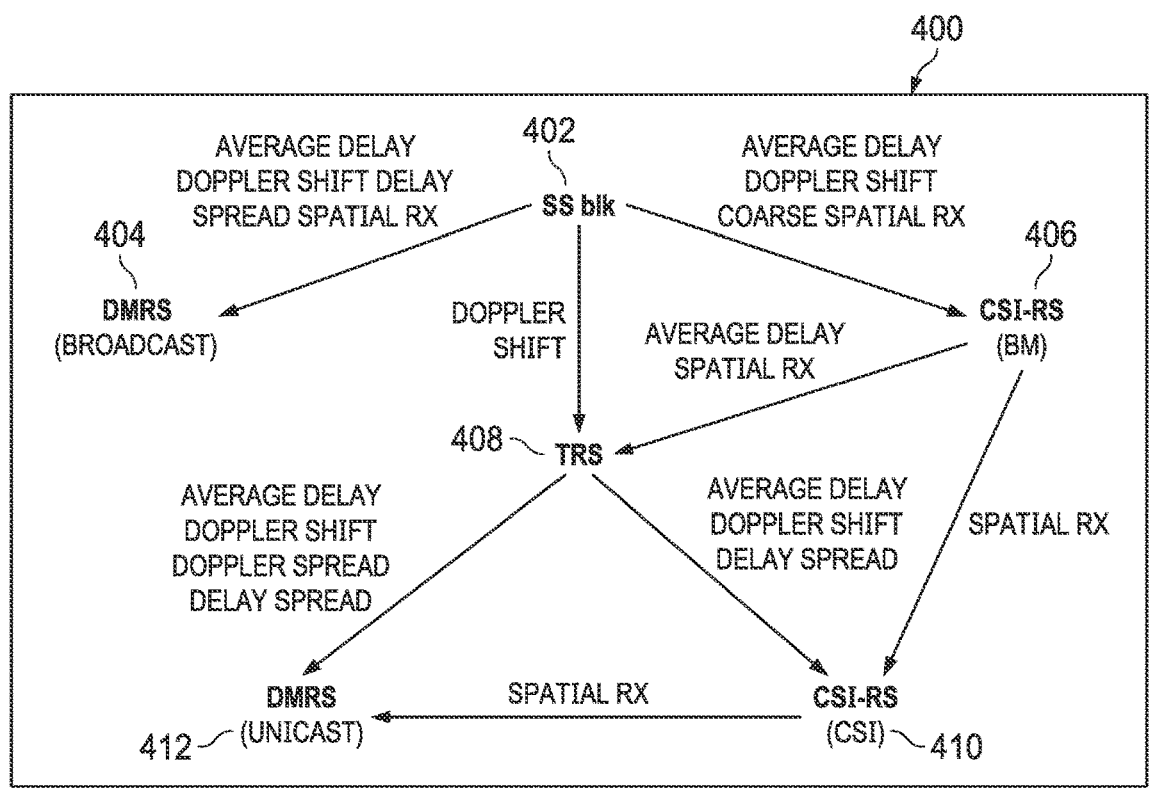
FIG. 4 is a diagram illustrating QCL assumptions among NR reference signals when narrow beams are used for communications.

FIG. 4 is a diagram 400 showing QCL assumptions among NR reference signals when narrow beams are used for communications. FIG. 4 shows QCL configurations among a SS block 402, a DMRS 404, a CSI-RS 406, a TRS 408, a CSI-RS 410 and a DMRS 412. Similar to FIG. 3, the DMRS 404 is for demodulation of signals in a broadcast channel, e.g., a physical broadcast channel (PBCH), that is transmitted before a TRS is configured. The CSI-RS 406 is transmitted for beam forming. The CSI-RS 410 is transmitted for channel estimation. The DMRS 412 is used for demodulation of signals transmitted in a unicast channel. An arrow starting from a first reference signal and ending at a second reference signal indicates that the second reference signal has a QCL relationship with the first reference signal with respect to one or more QCL parameters. The one or more QCL parameters shown on the arrow indicate that the one or more QCL parameters required by the second reference signal may be derived using the first reference signal. FIG. 4 shows that the reference signals have QCL configurations similar to those illustrated in FIG. 3, except for TRSs. In FIG. 4, the TRS 408 has a QCL relationship with the SS block 402 and the CSI-RS 406, respectively. The TRS 408 may be received using a Doppler shift derived based on the SS block 402, and may be received using an average delay and a spatial RX derived based on the CSI-RS 406. Data transmission may employ multiple narrow beams, and multiple narrow TRS beams may be required for tracking. To support both of the scenarios, configuration of TRSs and their QCL assumptions or association should be flexible.

Sounding reference signals (SRSs) are reference signals transmitted by a user equipment (UE) in the uplink for the purpose of enabling uplink channel estimation over a certain bandwidth. As such, the network may be able to perform communication with the UEs based on the uplink channel estimation. Moreover, due to channel reciprocity between the uplink and the downlink present in a time division duplex (TDD) communication system, the network may utilize the SRSs to perform dynamic scheduling. That is, the network may exploit channel-dependent scheduling. In this case, the time-frequency resources are dynamically scheduled, taking into account the different traffic priorities and quality of services requirements. Typically, UEs monitor several PDCCHs to acquire the scheduling decisions, which are signaled to the UEs by the network. Upon the detection of a valid PDCCH, a UE follows the scheduling decision and receives (or transmits) data.

The configuration of SRS related parameters of a SRS to be transmitted in the uplink (such as SRS transmission ports, SRS transmission bandwidth, SRS resources sets, transmission comb and cyclic shift, etc.) are semi-static in nature and may be provided through higher layer signaling, such as radio resource control (RRC) signaling. Moreover, the association between the downlink reference signals, such as CSI-RSs or DMRS, and the uplink SRS may be conveyed to the UE to accurately reflect the interference situation and for performing optimal beamforming. Thus, there is a need for apparatus and methods for signaling control information that accurately indicates a more dynamic configuration (not semi-static) of the aforementioned parameters, such as, for example, a portion of the transmission bandwidth required to transmit a subset of the SRS resource set (thereby implicitly indicating a transmission comb and cyclic shift) using a subset of the transmission ports associated with a particular set of downlink reference signals. The signaling of the control information may be closely tied to an actual data transmission. The transmission of the SRS may be periodic (i.e., periodic SRS, P-SRS or P SRS) as configured by Layer 3 RRC configuration signaling, semi-persistence (i.e., semi-persistent SRS, SP-SRS or SP SRS) activated/deactivated via Layer 2 MAC CE, or aperiodic (i.e., aperiodic SRS, A-SRS or AP-SRS or A SRS or AP SRS) indicated by Layer 1 DCI in PDCCH. As used herein, "AP" followed by a RS (e.g., TRS, SRS) means "aperiodic". Network adaptation, or adaptive transmission, has been studied in 3GPP, such as cell on/off, fast SCell activation/deactivation, SCell layer-1 dormancy, etc., to achieve efficient network adaptation for various purposes, such as network/UE power saving, interference management, network/UE complexity reduction, and so on. It is widely observed that NR Rel-15 SCell activation latency is generally in the range of tens to hundreds of milliseconds, which is even longer than LTE for many cases. It is thus desirable to reduce the SCell activation latency. The large latency in activating a SCell is primarily dominated by the time gap associated with the SSB measurement timing configuration (SMTC), which configures the UE to monitor and process SSB once every typically tens of milliseconds. Based on SSB, the UE can gain necessary information to set its automatic gain control (AGC), acquire timing, and perform frequency synchronization. On the contrary, in LTE SCell activation, these operations are based on the always-on common reference signal (CRS) and hence may be completed faster. To reduce the SCell activation latency, a key is to reduce or avoid the reliance on SSB for gaining necessary information about these operations during the SCell activation procedure.

3GPP TS 38.321, V16.2.1 (2020-09), Section 5.9, which is herein incorporated by reference in its entirety, specifies:
If an MAC entity is configured with one or more SCells, the network may activate and deactivate the configured SCells. Upon configuration of an SCell, the SCell is deactivated unless the parameter sCellState is set to activated for the SCell by upper layers. The configured SCell(s) is activated and deactivated by:
  receiving the SCell Activation/Deactivation MAC CE described in clause 6.1.3.10;
  configuring sCellDeactivationTimer timer per configured SCell (except the SCell configured with PUCCH, if any): the associated SCell is deactivated upon its expiry;
  configuring sCellState per configured SCell: if configured, the associated SCell is activated upon SCell configuration.
3GPP TS 38.321, Section 5.9 also specifies:
1> if the SCell is deactivated:
2> not transmit SRS on the SCell;
2> not report CSI for the SCell;
2> not transmit on UL-SCH on the SCell;
2> not transmit on RACH on the SCell;
2> not monitor the PDCCH on the SCell;
2> not monitor the PDCCH for the SCell;
2> not transmit PUCCH on the SCell.
HARQ feedback for the MAC PDU containing SCell Activation/Deactivation MAC CE shall not be impacted by PCell, PSCell and PUCCH SCell interruptions due to SCell activation/deactivation in TS 38.133 [11].
When SCell is deactivated, the ongoing Random Access procedure on the SCell, if any, is aborted
3GPP TS 38.321 specifies:
SCell in FR1 is known if it has been meeting the following conditions:
  During the period equal to max(5*measCycleSCell, 5*DRX cycles) for FR1 before the reception of the SCell activation command:
    the UE has sent a valid measurement report for the SCell being activated and
    the SSB measured remains detectable according to the cell identification conditions specified in clause 9.2 and 9.3.
  the SSB measured during the period equal to max (5*measCycleSCell, 5*DRX cycles) also remains detectable during the SCell activation delay according to the cell identification conditions specified in clause 9.2 and 9.3.
  Otherwise SCell in FR1 is unknown.
The requirements for FR1 unknown SCell activation specified in this clause apply when one of the following conditions is met
  'ssb-PositionInBurst' indicates only one SSB is being actually transmitted, or
  'ssb-PositionInBurst' indicates multiple SSBs and TCI indication is provided in same MAC PDU with SCell activation.
For the first SCell activation in FR2 bands, the SCell is known if it has been meeting the following conditions:
  During the period equal to 4 s for UE supporting power class 1/5 and 3 s for UE supporting power class 2/3/4 before UE receives the last activation command for PDCCH TCI, PDSCH TCI (when applicable) and semi-persistent CSI-RS for CQI reporting (when applicable):
    the UE has sent a valid L3-RSRP measurement report with SSB index
  SCell activation command is received after L3-RSRP reporting and no later than the time when UE receives MAC-CE command for TCI activation
  During the period from L3-RSRP reporting to the valid CQI reporting, the reported SSBs with indexes remain detectable according to the cell identification conditions specified in clauses 9.2 and 9.3, and the TCI state is selected based on one of the latest reported SSB indexes.
  Otherwise, the first SCell in FR2 band is unknown. The requirement for unknown SCell applies provided that the activation commands for PDCCH TCI, PDSCH TCI (when applicable), semi-persistent CSI-RS for CQI reporting (when applicable), and configuration message for TCI of periodic CSI-RS for CQI reporting (when applicable) are based on the latest valid L1-RSRP reporting.

How much reduction of cell activation latency can be achieved depends on scenarios and mechanisms applied to activate an SCell. The following example aspects may be considered. First, if no information at all about the SCell is known to the UE (the SCell is unknown to the UE), the potential activation latency reduction depends on how to make the SCell known to the UE, such as providing SCell SSB related information. When a SCell is deactivated for a UE, the SCell becomes an unknown SCell to the UE, and the UE does not have information of the SCell for communicating over the SCell. Information of the SCell, e.g., the SSB, may be made known to the UE so that the UE may activate the SCell with less latency. Second, more generally, even if the SCell is known to the UE, other functionalities may still be needed during SCell activation, such as AGC settling/setting (the procedure for the AGC to settle to an updated setting), time/frequency tracking, CSI measurement/acquisition, etc. For these purposes, generally, transmission(s) of one or more RSs during a SCell activation procedure may be considered so that the UE/network can acquire the necessary information for activation. These RSs that are configured for cell activation may be called temporary RSs. After the SCell is activated, various RSs may be communicated over the SCell as known to the ordinary skill in the art. Third, if a good amount of information about the SCell is already known by the UE but not yet fully utilized according to the Rel-15 mechanisms, the expected latency reduction via the embodiments of the present disclosure utilizing the information about the SCell would then be more substantial. The information about the SCell may be obtained by the UE from past activated time before deactivating the SCell, such as timing (e.g., DL timing), which may slowly drift away after deactivation but may still be used as a reference. Such information may be called pre-deactivation information or the like. The information may also be obtained from another cell as described later. In either case, necessary information unavailable to a UE can be made available to the UE to shorten the activation latency, which can be based on network signaling of information to the UE or based on network signals (e.g., reference signals, which sometimes also include PSS/SSS) that are sent specifically for efficient activation purposes.

A reference signal configured for SCell activation and used during the SCell activation procedure may be referred to as a temporary RS (tempRS, or temp RS, or tRS). The temporary RSs are specifically configured for SCell activation. As used herein, a temporary RS may also be referred to as a "temporary RS configuration", a "temporary RS resource", or a "temporary RS resource configuration". A temporary RS may include a TRS, a CSI-RS, a SSB, a SRS, etc. Any reference signal(s) configured for SCell activation may be referred to as temporary RS(s). For example, a TRS, a CSI-RS, a SSB, and/or a SRS configured or triggered for SCell activation on-demand and communicated for SCell activation may be referred to as temporary RS(s), while a TRS, a CSI-RS, a SSB, and/or a SRS not configured for SCell activation are not temporary RS(s). Some embodiments in the disclosure use a TRS as a temporary RS, which is the primary candidate for temporary RS. In this case, the temporary RS used for SCell activation may be referred to as an AP TRS based temporary RS. Some of these embodiments may also apply to cases where other RSs, e.g., a CSI-RS, a SSB or a SRS, are used as temporary RSs for SCell activation. It is noted that "transmit/receive RS resource", or "transmit/receive RS" may also be used to refer to or describe "temporary RS". The terms of "cell activation procedure" and "cell activation process" are used interchangeably in the present disclosure. A cell activation procedure may include initiating cell activation, performing the cell activation, and determining and/or indicating whether a cell is activated. The cell activation procedure may also include communicating one or more reference signals and processing the one or more reference signals, e.g., according to one or more functionality requirements, such as AGC settling, time/frequency tracking, fine timing, CSI measurement/acquisition, and so on. The terms of "cell activation" and "activation" are used interchangeably in the present disclosure.

Thus, as seen above, for SCell activation, different scenarios may exist and different functionalities during the SCell activation may be required. Consequently, different temporary RSs may be needed during a SCell activation procedure and for SCell activation. As an example, the scenarios include known SCell (the SCell is known to a UE) and unknown SCell (the SCell is unknown to a UE), as an example, which implies that the SCell activation procedure may or may not need SSB. As another example, for AGC setting (or settling) during SCell activation, TRS and/or CSI-RS may be needed. For time/frequency tracking, TRS may be needed, as an example. For CSI measurement/acquisition, CSI-RS and CSI reporting, and/or SRS may be needed, as an example. However, to mandate that some or all these RSs be transmitted and processed during the SCell activation may be unrealistic due to the high RS overhead and processing complexity. This indicates that under difference circumstances, different RSs and different activation procedures need to be adopted. Therefore, it is desirable to provide a flexible framework for configuration and triggering temporary RS during SCell activation with reasonable overhead and complexity.

In some embodiments, for the case that the SCell to be activated is known to a UE, a temporary RS may be supported during the SCell activation procedure for both FR1 and FR2. This may help expedite the SCell activation process and improve SCell activation efficiency. In one example, the temporary RS may provide at least the functionalities of AGC setting or settling and time/frequency tracking during the SCell activation procedure. Thus, the temporary RS may include a TRS and/or a CSI-RS. The TRS may also have potential functionalities of CSI measurement/ acquisition and cell search. As used herein, a RS providing or supporting a functionality means that transmission of the RS enables the functionality to be performed based on the RS.

TRS may be selected as temporary RS for Scell activation. Other RS candidates, e.g. aperiodic CSI-RS, P/SP-CSI RS, SRS and RS based on SSS/PSS, may also be considered. The TRS may be triggered by downlink control information (DCI) or medium access control-control element (MAC-CE) on demand. UEs may receive, process, measure, or adjust TRS settings/parameters based on a triggered temporary RS during an SCell activation procedure no earlier than a certain slot, e.g., slot n+k in one embodiment below.

Proper network assistance information to a UE and/or UE assumptions on common properties for multiple serving cells can lead to highly efficient SCell activation and may be considered for standardization. Based on network configuration and standard specification, a UE may assume some common properties across multiple serving cells, and thus a good amount of information about a to-be-activated SCell can be derived by the UE, which may not yet be fully utilized according to the Rel-15 mechanisms. One reason for multiple serving cells sharing some common properties in practice is that the cells may be co-located and are associated with the same hardware, such as the same set of antennas, same RF components, etc. This is especially so if carriers of the cells are in the same band (e.g., intra-band CA) or in bands close to each other. 3GPP has already defined several types of quasi co-located (QCL) relationship between antenna ports of different signals so that a property derived from one signal can be extended to another signal. This concept can be utilized and generalized to effectively reduce SCell activation latency in applicable scenarios.

Two quasi co-located serving cells may share one or more of the following properties, and each property may be exploited by a UE to gain side information about the to-be-activated SCell to reduce the latency of activating the SCell. The properties may include:

Pathloss, coupling loss, or RSRP

If the carriers of two cells are close in frequency domain such as in intra-band CA (contiguous or non-contiguous), the pathloss values and shadow fading values, respectively, may be the same for the two cells. Moreover, if the same set of antennas are used, the antenna gains, and hence the coupling loss values and RSRP values, respectively, may also be very close for the two cells. For cells whose carriers are not so close but not too far to be highly uncorrelated, the difference between the pathloss values may be a predictable value which may be derived by a UE and/or gNB.

The side information of pathloss, coupling loss, or referenced signal received power (RSRP) for the to-be-activated SCell can be useful to set the (initial) AGC, which can help speed up the activation.

Frequency/timing offset

Frequency/timing information about the to-be-activated SCell may be inferred from another cell. Even if such information is not sufficient for fine tracking, it can still be useful for reducing the latency involved in achieving frequency/time tracking. For example, if the symbol boundaries for two cells are roughly aligned such as within a CP length (or with a fixed offset), a UE may be able to set its FFT window for one cell based on the other, and further refinement based on a temporary RS may be done.

Note that an SCell without SSB already utilizes this mechanism, as specified in TS 38.213 V16.3.0 (2020-09), which is herein incorporated by reference in its entirety:

For a serving cell without transmission of SS/PBCH blocks, a UE acquires time and frequency synchronization with the serving cell based on receptions of SS/PBCH blocks on the PCell, or on the PSCell, of the cell group for the serving cell.

However, a UE cannot assume common properties across serving cells without network assistance or standardized UE behavior. Network signaling may be sent to the UE indicating the side information and the UE assumptions with the side information. The network signaling may be specified in standard, e.g., Rel-17. Some approaches (not mutually exclusive) to support this are described below.

Introduce new QCL types for acquiring pathloss, RSRP, and frequency/time synchronization across carriers The existing QCL types can be generalized to define that the properties as described above may be assumed by a UE if signalled by a network. QCL relationship may be signalled based on reference to cell index, SSB, or RS. For example, cell 1's SSB may be configured as QCL with cell 2's SSB. Since such a relationship is reciprocal between cell 1 and cell 2, it is not necessary to configure the relationship in the reverse direction, which can be assumed by the UE.

Introduce cell sets sharing common properties

More generally, the above described common properties may be shared among multiple cells, such as intra-band cells or cells in adjacent bands. Therefore, it may be useful to introduce cell sets with common properties. This may be implemented similarly to timing advance groups (TAGs), that is, cells are configured into multiple TAGs, and cells within the same TAG share the same TA.

Introduce offset values

Even if some properties are not the same between two cells, there may be a fixed offset (or an offset with an upper bound) between them and known to the network or that can be derived by a UE. The network can signal the fixed offset value to the UE. For example, if the symbol boundary of cell 1 is x ms ahead of that of cell 2, the x value can be signalled to the UE, and the UE can apply it for acquiring rough timing. For another example, if the pathloss for cell 1 is y dB higher than that for cell 2, the y value can be signalled to the UE for estimating its initial AGC setting. Alternatively, the UE may derive the offset value, e.g., based on the carrier frequency separation of the cells.

According to some embodiments, it is proposed to support efficient SCell activation via enhanced UE assumptions to reduce latency associated with estimating pathloss, coupling loss, RSRP, frequency/timing offset, and/or initial UL TA on a to-be activated SCell. Examples may include one or more of the following embodiments.

Utilizing cross-carrier QCL assumptions. For example, a to-be-activated SCell may rely on an activated QCLed cell for initial pathloss, and/or RSRP estimation.

Utilizing configured cell sets with common properties. For example, cells within a band or bands close to each other in frequency may be configured in one cell set with similar pathloss and/or timing.

Utilizing specified cross-carrier offset values. For example, a network may specify pathloss offsets and/or timing offsets between two cells or between two cell sets.

In cases where a UE cannot derive all necessary information for SCell activation based on available UE assumptions, one or more temporary RSs may be reused to support efficient SCell activation, by providing UE with information that cannot be derived based on available UE assumptions.

The following describes triggering configuration, triggering command, and triggering procedure for SCell activation. The current SCell activation procedure uses L2 signaling. This is herein referred to as L2 activation. With various enhancements proposed in Rel-17 that may significantly shorten the latency, it is meaningful to further reduce the delay caused by the L2 signaling. In one embodiment, L1 signaling is considered for its low latency. L1 signaling may be used for SCell activation. This is herein referred to as L1 activation. Note that the L1 activation herein does not necessarily mean or require a newly designed L1 signaling or L1 procedure; rather, existing L1 signaling may be reused just as the reuse of existing aperiodic RS, and once a UE receives L1 signaling associated with a deactivated SCell, the L2 activation procedure starts. Therefore, if the activation procedure involves aperiodic CSI-RS resource trigger and/or aperiodic CSI reporting trigger, the network and UE can then use one or more of these triggers associated with a deactivated SCell as the activation command for the SCell. This not only reduces the delay caused by L2 signaling and possibly multiple signaling to complete one activation, but also limits the control channel overhead. The instruction/information carried by the L1 signaling may be sent via downlink control information (DCI), but in some embodiments, the same instruction/information may be sent via a MAC CE. A potential issue of this approach is the reliability of the DCI, which does not have acknowledgement/non-acknowledgement/hybrid automatic repeat request (ACK/NACK/HARQ), while a MAC command does. Thus, if the DCI is missed or incorrectly decoded, the network and the UE may be temporarily out of sync until the network/UE find the problem and correct it. Nevertheless, the probability of such error occurring is small (<1% in general), and the DCI based approach may still be beneficial to most of the scenarios.

Note that in this case where L1 activation is utilized, there may not be a need to transmit the MAC signaling for activation. For proposals that keep using MAC signaling, the MAC signaling may also be accompanied with a L1 signaling, which, however, makes the MAC signaling unnecessary.

According to an example embodiment, efficient SCell activation may be supported via existing L1 aperiodic (AP) RS (e.g., TRS/CSI-RS/SRS based temporary RS, if supported) triggers with enhanced activation procedure, and an SCell activation procedure may be initiated when a UE receives a temporary RS trigger associated with the SCell. A L1 AP RS trigger triggers or indicates transmission or reception of a temporary RS. For example, an AP TRS (or AP CSI-RS) trigger triggers a receiver to receive an associated AP TRS (or CSI-RS). An AP SRS trigger triggers a receiver of the trigger to transmit an associated AP TRS.

Figure 5:
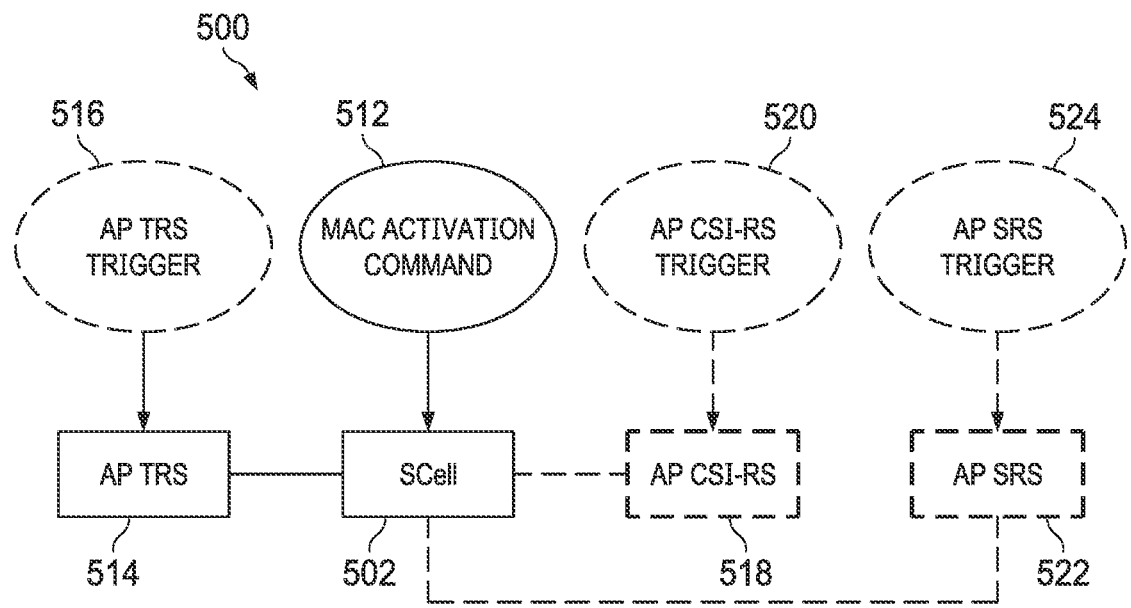
FIG. 5 is a diagram illustrating embodiment components for SCell activation according to example embodiments of the present disclosure.

Embodiments for SCell activation triggering (i.e., activation command) configuration and temporary RS configuration are provided. The embodiments provide a configuration for triggering activation of a SCell, and configuration of a temporary RS to be transmitted during a SCell activation procedure for activating the SCell. For a configured SCell to be activated, a TRS may be configured, and optionally an AP CSI-RS and/or an AP SRS may be configured. These RSs will be useful during the SCell activation procedure. According to some embodiments, at least the TRS may be always transmitted during the SCell activation, for various ways that the SCell activation is triggered: via a MAC signaling, via an AP TRS L1 trigger for the TRS, via an AP CSI-RS L1 trigger for the CSI-RS which is associated with the SCell and hence the TRS, or via an AP SRS L1 trigger for the SRS which is associated with the SCell and hence the TRS. The following provides some embodiments components and possible ways for SCell activation, with reference to FIG. 5. FIG. 5 illustrates a diagram 500 of embodiment components for SCell activation.

In some embodiments, mandatory components for SCell activation may include:

An MAC activation command 512 to activate a SCell 502 may always be supported, sent on an activated cell. This may be configurable, or may not necessarily be used.

An AP TRS 514 may always be configured with the SCell, and so it is always transmitted during the SCell activation.

That is, to activate a SCell 502, the MAC activation command 512 may be sent to trigger the activation, and the AP TRS 514 configured for the activation is sent during the SCell activation. The MAC activation command 512 instructs/indicates/triggers a UE to activate the SCell 502. The UE, when receiving the MAC activation command 512, may start monitoring the SCell 502 and perform cell activation, e.g., based on at least the received the AP TRS 514. The UE may perform, based on the AP TRS 514, at least one of AGC settling, frequency tracking, time tracking, or fine timing. The activation command 512 may be sent on an activated cell serving the UE, which is different from the to-be-activated SCell. Transmission of the AP TRS 514 may be triggered by a triggering command sent on the activated cell. The triggering command may be included in a MAC CE carrying the MAC activation command 512 or in another MAC CE sent at the same time in the same PDSCH. The AP TRS 514 may be one of a set of TRSs configured for activation of the SCell, and may be indicated by the triggering command. Transmission of the AP TRS 514 may include one or more transmissions of the AP TRS 514 on one or more slots.

In some embodiments, optional components for SCell activation may include one or more of the following:

An AP TRS trigger 516 (sent on another cell (e.g., an activated cell serving the UE) different than the to-be-activated SCell) to trigger the AP TRS 514 configured with the SCell 502. When received, the SCell activation may start without need to receive the MAC activation command 512. The AP TRS trigger 516 triggers/indicates the UE to receive the AP TRS 514. A UE receiving the AP TRS trigger 516 triggering/indicating a reception of AP TRS 514 may be triggered to start the SCell activation, without the need to receive the MAC activation command 512. In this case, the MAC activation command 512 may not need to be sent to the UE to trigger activation of the SCell 502.

An AP CSI-RS 518 may be configured with the SCell 502. If the SCell activation starts, the AP CSI-RS 518 is also sent to the UE.

An AP CSI-RS trigger 520 (sent on another cell (e.g., an activated cell serving the UE) different than the to-be-activated SCell) to trigger the AP CSI-RS 518 configured with the SCell 502. When received, the SCell activation may start without MAC activation command. The AP CSI-RS trigger 520 triggering/indicating a reception of AP CSI-RS 518 may trigger/indicate the UE to start the SCell activation. In this case, the MAC activation command 512 may not need to be sent to the UE to trigger activation of the SCell 502.

An AP SRS 522 may be configured with the SCell 502. If the SCell activation starts, the AP SRS 522 is also sent.

An AP SRS trigger 524 (sent on another cell (e.g., an activated cell serving the UE) different than the to-be-activated SCell) to trigger the AP SRS 522 configured with the SCell 502. When received, the SCell activation may start without MAC activation command. The AP SRS trigger 524 triggering/indicating a transmission of AP SRS 522 may trigger/indicate the UE to start the SCell activation. In this case, the MAC activation command 512 may not need to be sent to the UE to trigger activation of the SCell 502.

In some embodiments, the mandatory components may be used to trigger an SCell activation. For example, a gNB sends a SCell activation command, e.g., in a MAC CE, to trigger activation of a SCell, and a TRS as a temporary RS is configured for the activation of the SCell. In another embodiment, one of the optional components may be used to trigger a SCell activation. For example, a TRS trigger triggering transmission of a TRS may be sent by a gNB to a UE to trigger SCell activation, with the TRS configured for the SCell activation. As another example, a CSI-RS trigger triggering transmission of a CSI-RS may be sent to trigger a SCell activation with the CSI-RS configured for the SCell activation. As another example, a SRS trigger triggering transmission of a SRS may be sent to trigger a SCell activation with the SRS configured for the SCell activation. In any of the cases, a TRS, a CSI-RS, a SRS, or any combination thereof, may be configured for the SCell activation, and sent during the SCell activation. The CSI-RS and SRS may be associated with the TRS, or QCLed with the TRS. The SCell activation triggered by a MAC command may be referred to as an L2 command initiated activation. The SCell activation triggered by a temporary RS trigger may be referred to as an L1 RS trigger initiated activation.

Figure 6:
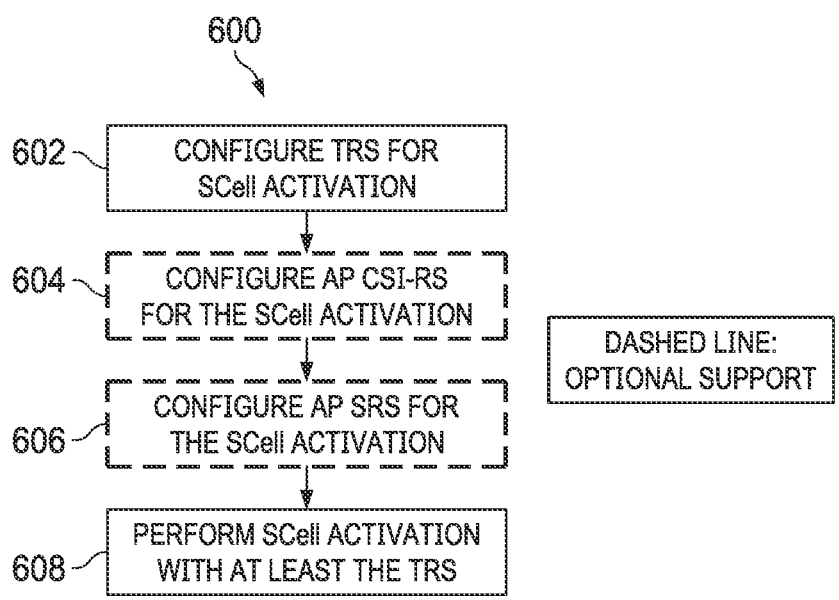
FIG. 6 illustrates a flow diagram of an embodiment configuration process for SCell activation according to example embodiments of the present disclosure.

FIG. 6 illustrates a flow diagram 600 of an embodiment configuration process for SCell activation. A gNB may configure a TRS for SCell activation (block 602). Optionally, the gNB may configure an aperiodic CSI-RS for the SCell activation (block 604). Optionally, the gNB may configure an aperiodic SRS for the SCell activation (block 606). A UE may perform the SCell activation with at least the TRS configured for the SCell activation (block 608).

Embodiments for SCell activation triggering and activation procedures are provided. In one embodiment, during the SCell activation, an a-periodic (AP) TRS may be transmitted. The SCell activation may be initiated by a MAC command (L2 signaling), during which the AP TRS is transmitted. The SCell activation may be initiated by a DCI (L1 signaling), during which the AP TRS is transmitted. An AP TRS trigger is not needed. Since the SCell activation is linked to an AP TRS, the AP TRS may be configured for the SCell for its activation. The AP TRS may be independent of the SCell BWP configuration, that is, regardless which BWP of the SCell is to be activated, the same AP TRS is transmitted, which could simplify the activation design. Alternatively, the AP TRS may be specific for a SCell BWP, and the triggering of the AP TRS leads to the activation of the associated BWP. If no explicit signaling of AP TRS or BWP is sent, then a default BWP and its associated default AP TRS may be sent. Seven embodiments are provided below with references to FIGS. 7-13 for SCell activation.

Figure 7:
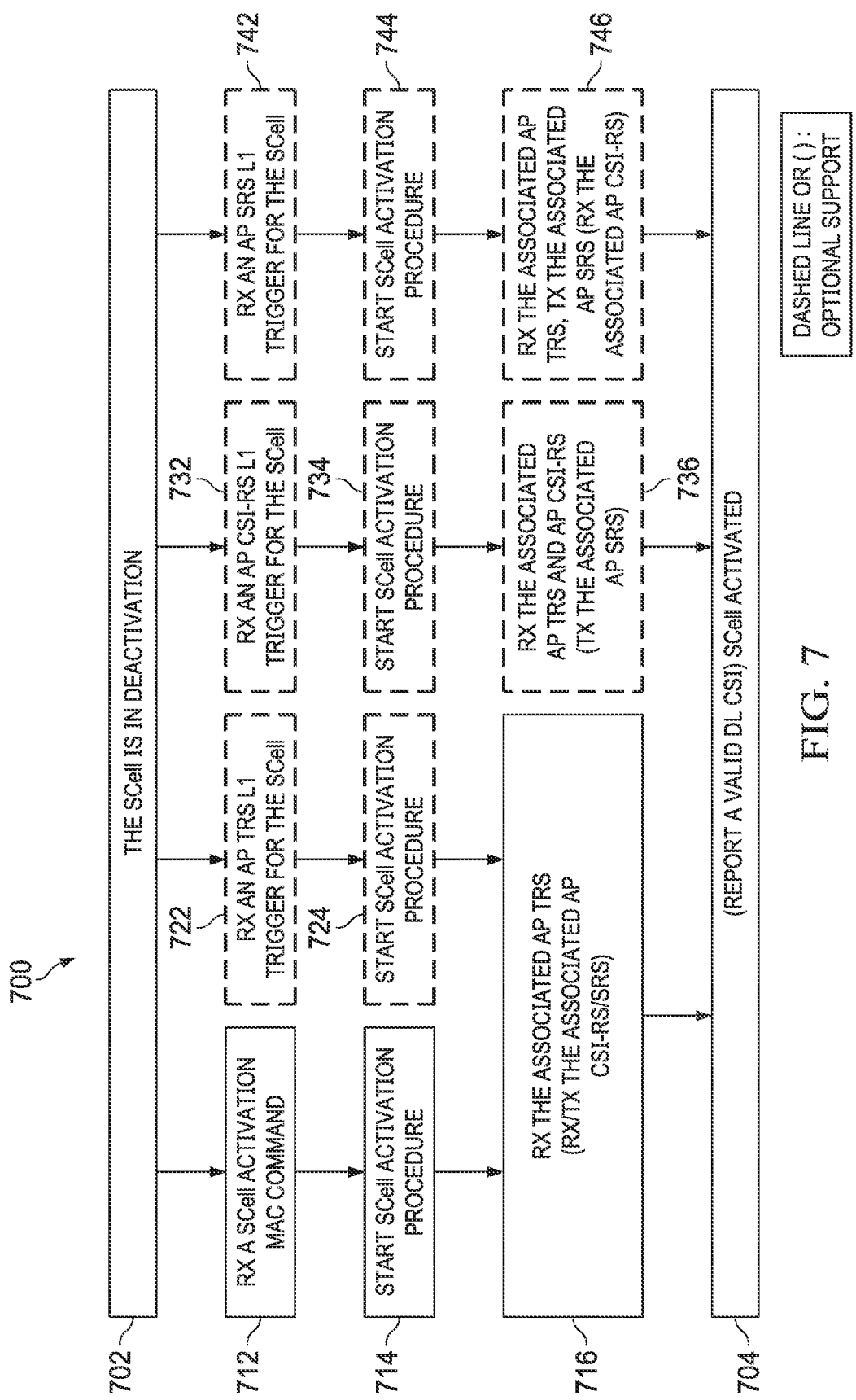
FIG. 7 illustrates a diagram of a first example embodiment for SCell activation.

FIG. 7 illustrates a diagram 700 of a first example embodiment for SCell activation triggering and activation. FIG. 7 shows four embodiment procedures for activating a SCell that is deactivated. As shown in FIG. 7, the SCell is in a deactivated state for a UE (block 702). When a gNB determines to activate the deactivated SCell for the UE, the gNB may trigger activation of the SCell. In a first embodiment procedure, the gNB may send an MAC activation command to the UE for activating the deactivated SCell. This initiates a SCell activation process/procedure between the UE and the gNB. The UE receives the MAC activation command from the gNB (block 712). The UE may optionally send a response to the gNB indicating that the MAC activation command has been correctly received and decoded. The UE may start the SCell activation procedure (block 714), during which, the UE monitors the SCell and may receive an AP TRS configured for activation of the SCell (block 716). The UE may optionally receive an AP CSI-RS associated with the AP TRS or transmit a SRS associated with the AP TRS during the SCell activation procedure (block 716). The UE may send a message to the gNB indicating that the SCell is activated, e.g., by reporting a valid downlink (DL) channel state indicator (CSI) (block 704). The UE may measure the AP CSI-RS to generate a CSI report including a measurement result of the AP CSI-RS. The measurement result may include a CSI, such as a channel quality indicator (CQI), etc. When the measurement result satisfies a condition, e.g., exceeding a threshold, the CQI value is nonzero, etc., the measurement result is valid. The CSI report including a valid CSI or CQI indicates that the SCell is activated for the UE. The CSI report may indicate that a BWP of the SCell is active. If the measurement result does not satisfy the condition, the SCell is not activated for the UE. The UE may send a message indicating that the SCell is not activated. In an example, the UE may not send such a message, based on which the gNB learns that the SCell is not activated for the UE.

The SCell may be configured with a default AP TRS, and optionally, a default AP CSI-RS and/or AP SRS. The MAC activation command may use existing design, in which no information of the TRS/CSI-RS/SRS is provided, but the associated default TRS/CSI-RS/SRS as configured by RRC signaling are automatically triggered. There may be more than one AP TRS (or CSI-RS/SRS) configured for the SCell or SCell activation process, but one is configured as the default. The default may be explicitly configured, or implicitly through a BWP configuration, e.g., multiple AP TRSs are associated with multiple BWPs, respectively, for the SCell, and one BWP is signaled as the default for this SCell activation. Thus, the default AP TRS associated with the default BWP is triggered. This reduces MAC/DCI signaling overhead and avoids the need for a new design for the MAC activation command. In another embodiment, the MAC activation command may use an enhanced design, such as further including one or more fields to trigger one or more of TRS/CSI-RS/SRS or one of the BWPs. This requires more MAC overhead, but provides more flexibility for the network. For example, if two or more TRSs are associated with (configured for) the SCell, the MAC command can activate/select one of them (e.g., one TRS is linked to a BWP, and by selecting a TRS or selecting a BWP, the linked BWP/TRS are also activated/selected) or more of them. Then after transmission of the AP TRS, according the network configuration/activation, the associated RSs (CSI-RS/SRS) may also be transmitted/received/processed. The CSI-RS, SRS, and TRS may be associated with the same BWP, and one may be QCLed to another. For example, the CSI-RS may be QCLed to the TRS with QCL Type A, and SRS uses the TRS and/or CSI-RS for its pathloss RS. A valid DL CSI may be reported from a UE to a gNB, which may generally include at least a valid channel quality indicator (CQI) value (e.g., a non-zero CQI value, or a CQI value satisfying a criterion). Some embodiments on this aspect will be further discussed later. After that, the SCell activation is completed and the SCell is activated.

FIG. 7 also shows a second embodiment procedure, where the gNB sends a L1 AP TRS trigger associated with the deactivated SCell. Even without receiving a L2 MAC activation command, the UE may still understand that receiving of the L1 AP TRS trigger initiates/triggers a SCell activation process/procedure. The UE receives the L1 AP TRS trigger associated with the SCell (block 722) and starts the SCell activation procedure (block 724), during which, the UE monitors the SCell and may receive an AP TRS configured for activation of the SCell (block 716). The UE may optionally receive an AP CSI-RS associated with the AP TRS or transmit a SRS associated with the AP TRS during the SCell activation procedure (block 716). The UE may send a message to the gNB indicating that the SCell is activated, e.g., by reporting a valid (CSI) (block 704), as discussed above.

The AP TRS associated with the L1 AP TRS trigger may or may not be a default AP TRS, which provides the network more flexibility to select which AP TRS to transmit or which BWP to activate. For example, a default TRS (TRS1) may be associated with a default BWP1, and the L1 AP TRS trigger is for TRS2 and BWP2. Then the UE understands that this SCell activation is to make BWP2 active. Then after transmission the AP TRS, according the network configuration/activation, the associated RSs (CSI-RS/SRS) may also be transmitted/received/processed. The CSI-RS, SRS, and TRS may be associated with the same BWP, and one may be QCLed to another. For example, the CSI-RS may be QCLed to the TRS with QCL Type A, and the SRS uses the TRS and/or CSI-RS for its pathloss RS. A valid DL CSI may be reported from the UE to the gNB, which may generally include at least a valid CQI value. Some embodiments on this aspect will further be discussed later. After that, the SCell activation is completed and the SCell is activated.

FIG. 7 also shows a third embodiment procedure, where the gNB sends a L1 AP CSI-RS trigger associated with the deactivated SCell. Even without receiving a L2 MAC activation command, the UE may still understand that receiving of the L1 AP CSI-RS trigger initiates/triggers a SCell activation process/procedure. The UE receives the L1 AP CSI-RS trigger associated with the SCell (block 732) and starts the SCell activation procedure (block 734), during which, the UE monitors the SCell and may receive an associated AP TRS and an associated AP CSI-RS configured for activation of the SCell (block 736). The UE may optionally transmit a SRS associated with the AP TRS for the SCell during the SCell activation procedure (block 736). The UE may send a message to the gNB indicating that the SCell is activated, e.g., by reporting a valid (CSI) (block 704), as discussed above. The AP CSI-RS associated with the L1 AP CSI-RS trigger may or may not be a default AP CSI-RS. It may be associated with a certain default TRS and optionally a default SRS and BWP, which provides the network more flexibility to select which AP CSI-RS/TRS/SRS to transmit or which BWP to activate. For example, a default TRS (TRS1) may be associated with a default BWP1 and default CSI-RS1, and the L1 AP CSI-RS trigger is for CSI-RS2, which is linked to BWP2 and TRS2. Then the UE understands that this SCell activation is to make BWP2 active and TRS2 and CSI-RS2 are to be expected. After transmission of the AP TRS2, the AP CSI-RS2 is sent and received. Optionally, an AP SRS may be transmitted according to configuration/activation, and optionally, a valid DL CSI may be reported from the UE to the gNB, which generally includes at least a valid CQI value. The CSI-RS, SRS, and TRS may be associated with the same BWP, and one may be QCLed to another. For example, the CSI-RS may be QCLed to the TRS with QCL Type A, and the SRS uses the TRS and/or CSI-RS for its pathloss RS. Some embodiments on this aspect will be further discussed later. After that, the SCell activation is completed and the SCell is activated.

FIG. 7 also shows a fourth embodiment procedure, where the gNB sends a L1 AP SRS trigger associated with the deactivated SCell. Even without receiving a L2 MAC activation command, the UE may still understand that receiving of the L1 AP SRS trigger initiates/triggers a SCell activation process/procedure. The UE receives the L1 AP SRS trigger associated with the SCell (block 742) and starts the SCell activation procedure (block 744), during which, the UE monitors the SCell and may receive an associated AP TRS configured for activation of the SCell and transmit an associated AP SRS (triggered by the L1 AP SRS trigger) (block 746). The UE may optionally receive an associated AP CSI-RS during the SCell activation procedure (block 746). The UE may send a message to the gNB indicating that the SCell is activated, e.g., by reporting a valid (CSI) (block 704), as discussed above. The AP SRS associated with the L1 AP SRS trigger may or may not be a default AP SRS. It may be associated with a certain default TRS and optionally a default CSI-RS and BWP, which provides the network more flexibility to select which AP CSI-RS/TRS/SRS to transmit or which BWP to activate. For example, a default TRS (TRS1) may be associated with a default BWP1 and default SRS1, and the L1 AP SRS trigger is for SRS2, which is linked to BWP2 and TRS2, then the UE understands that this SCell activation is to make BWP2 active, and TRS2 is to be expected and SRS2 is to be sent. Then after reception of the AP TRS2, the AP SRS2 is sent. Optionally an AP CSI-RS is transmitted according to configuration/activation, and optionally a valid DL CSI is reported from the UE to the gNB, which generally includes at least a valid CQI value. Some embodiments on this aspect will be further discussed later. After that, the SCell activation is completed and the SCell is activated.

Figure 8:
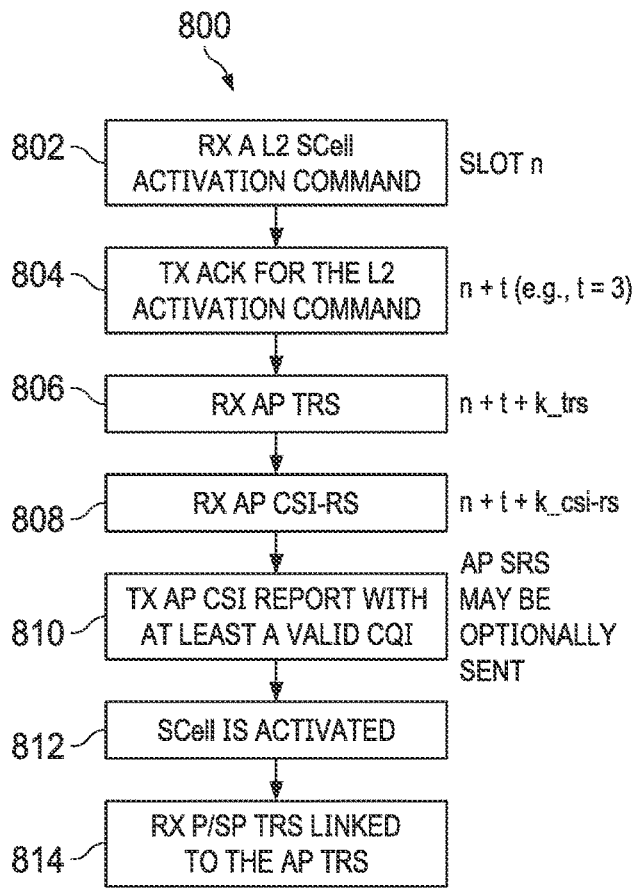
FIG. 8 illustrates a diagram of a second example embodiment for SCell activation.

FIG. 8 illustrates a diagram 800 of a second example embodiment for SCell activation triggering and activation. In the example of FIG. 8, a gNB sends, to a UE, an MAC activation command (L2 SCell activation command) for a deactivated SCell at slot n, and the UE receives the L2 SCell activation command in slot n (block 802) in a MAC CE. The MAC CE is carried in a PDSCH sent on an activated serving cell of the UE. The UE needs to send an ACK/NACK for the PDSCH carrying the MAC CE, e.g., on one of the activated serving cells of the UE. If the PDSCH carrying the MAC CE is successfully decoded, an ACK will be sent, and this initiates the SCell activation process of the UE; otherwise, if the PDSCH is not successfully decoded, a NACK will be sent, and the gNB will have to transmit another PDSCH carrying the MAC CE command, e.g., on one of the activated serving cells of the UE, and the SCell activation process will start in a slot that an ACK for the another PDSCH is sent. From the reception of the PDSCH carrying the MAC CE to the sending of the ACK, it may take t slots. In some cases, t=3, i.e., the time needed for the UE to decode MAC signaling is 3 slots. The value t may also be other UE capability related values, which may be determined before the UE sends the ACK. The value t may include other latency that the UE needs to process the MAC CE and take action in L1 layer. In any case, the network and the UE need to have a common reference timing for the rest of the signals to be transmitted/received without other signaling, and one embodiment for the common reference timing is the slot of the ACK, and another embodiment for the common reference timing is a slot after the slot of the ACK, so that the UE's Layer 1 is ready. As shown, the UE transmit an ACK message acknowledging receipt of the L2 activation command (block 804).

The gNB may then transmit an AP TRS to the UE on the SCell to be activated and the UE receives the AP TRS at slot n+t+k_trs (block 806), where k_trs is a triggering offset associated with the UE receiving the AP TRS in terms of number of slots. In this example, the TRS is used as a temporary RS for SCell activation. The triggering offset may indicate a duration (e.g., a number of slots) from receiving a RS trigger to receiving/transmitting the triggered RS. The triggering offset having a value of 0 indicates the same slot. This could be related to UE capability, and after the UE reports the capability, the gNB configures AP TRS triggering offset. This allows the UE to have sufficient time to prepare for receiving the AP TRS. The AP TRS is configured for the SCell activation beforehand. No triggering for the TRS is needed in this example, which reduces signaling overhead and latency. In case that multiple AP TRSs are configured for the SCell activation, one of them is configured as the default, and the default AP TRS is sent while other AP TRSs will not be sent. Some embodiments about this have been described previously in the disclosure. The MAC CE may also be enhanced to include a trigger for one of the AP TRSs to be selected. Based on the received AP TRS, the UE can perform AGC settling, time/frequency tracking, etc. The AP TRS may be repeated within one slot or across different slots.

In some embodiments, at least one of a default AP CSI-RS and a default AP SRS may be configured for the SCell activation. In an example, the SCell's activation process may be configured with a default AP CSI-RS with a triggering offset k_csi-rs, and an AP CSI-RS may be transmitted to the UE on the SCell to be activated and the UE receive the AP CSI-RS in slot n+t+k_csi-rs (block 808). The CSI-RS and/or the SRS transmitted to the UE, if configured and triggered in an on-demand way specifically for SCell activation, may be viewed as a temporary RS for this SCell activation process of the UE. The AP CSI-RS as the temporary RS for the SCell activation process may be triggered as needed for SCell activation, and is different from the conventional CSI-RS that is generally periodic (sent according to a pre-configured slot periodicity and slot offset without trigger, which may require a longer time for the UE to receive) or semi-persistent (sent according to a pre-configured slot periodicity and slot offset once it is activated by a command that can only turn it on but does not control the slot positions of the transmissions, which may require a longer time for the UE to receive) during SCell activation. The default AP CSI-RS may be identified based on that it is the default AP CSI-RS for the BWP associated with the triggered AP TRS. In this case, no triggering for the CSI-RS is needed, which reduces signaling overhead and latency. It may be preferred, as an example, to have the CSI-RS to be received after the TRS so that the AGC/tracking achieved from the TRS can be applied to the CSI-RS reception and processing, and thus in general the network should ensure k_csi-rs>k_trs. As another example, the AP CSI-RS may be sent in slot n+t+k_trs+k_csi-rs, which ensures that the CSI-RS is later than the TRS. If the TRS is transmitted in multiple slots, the AP CSI-RS may be sent in slot n+t+k_trs+k+k_csi-rs, where k is a number of slots with AP TRS transmissions (k is an integer greater than 1) and k may be specified in a RRC configuration or standard, such as k=2, 4, etc., which ensures that the CSI-RS is based on sufficient time-domain samples of the TRS. Based on the CSI-RS, the UE may generate an (AP) CSI report, which may include at least a valid CQI indicating that the SCell is successfully activated. Then the UE will CSI send the report (with at least the valid CQI) to the gNB (block 810) on the SCell. The slot that the report with the valid CQI is sent can be viewed as the time that the SCell activation is completed, i.e., the SCell is activated (block 812). If the CSI measurement does not include a valid CQI, the SCell is not activated. The UE may also send a CSI report including the invalid CQI (e.g., CQI=0), based on which, the network knows that the SCell is not activated for the UE, such as due to poor channel conditions, etc. Note that if a default AP SRS is also configured/identified for the SCell activation process, the UE should send the AP SRS, which may be after the TRS, and before or after the CSI-RS. No triggering for the SRS is needed, which reduces signaling overhead and latency. An embodiment of the AP SRS transmission will be described further later in the present disclosure.

In addition, an AP TRS is generally not a standalone RS, i.e., it relies on a P/SP TRS. The AP and the P/SP TRS may be QCLed with each other, and in particular, the AP TRS may be dependent on the P/SP TRS. However, for a deactivated SCell, the AP TRS is not able to depend on a P/SP TRS on the deactivated SCell. There are a few embodiments here. One embodiment is that the AP TRS relies on a cross-carrier signal, for example, the AP TRS is QCLed with a cross-carrier SSB or a cross-carrier P/SP TRS with QCL Type A and QCL Type D (for FR2). The cross-carrier SSB or P/SP TRS should be on an activated carrier/cell which is generally an intra-band carrier, and should be configured for or received by the UE before the activation process starts. In another embodiment, in case of the cross-carrier SSB or P/SP TRS not configured or not transmitted to the UE (e.g., that carrier is also deactivated), the AP TRS may be repeatedly transmitted in consecutive slots after n+t+k_trs so that the UE can derive sufficient tracking information from the AP TRS. The AP TRS may still be QCLed with a P/SP TRS of the SCell, and that P/SP TRS may automatically start after the SCell activation is completed if the P/SP TRS is configured with the AP TRS. The UE may then receive the P/SP TRS linked to the AP TRS (block 814).

Figure 9:
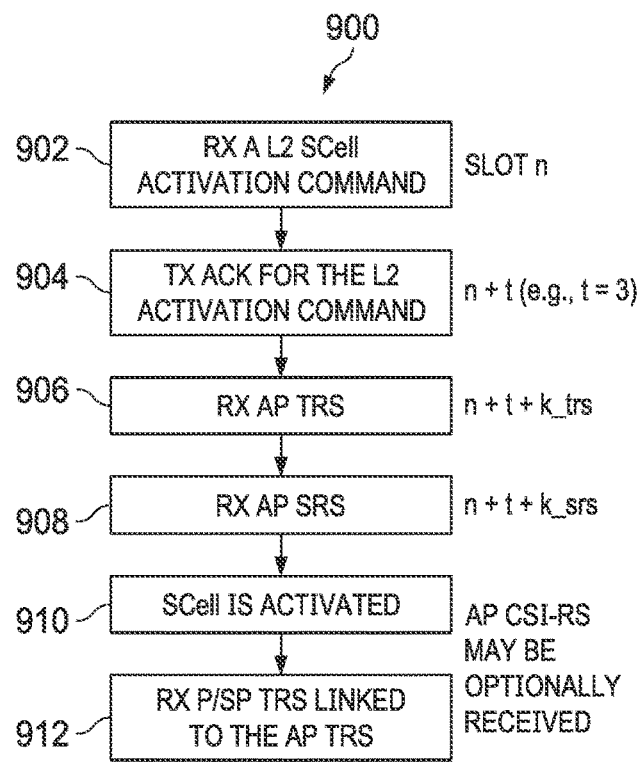
FIG. 9 illustrates a diagram of a third example embodiment for SCell activation.

FIG. 9 illustrates a diagram 900 of a third example embodiment for SCell activation triggering and activation. In the example of FIG. 9, a gNB sends, to a UE, an MAC activation command (L2 SCell activation command) for a deactivated SCell at slot n, and the UE receives the L2 SCell activation command at slot n (block 902) in a MAC CE. The MAC CE is carried in a PDSCH sent on an activated serving cell of the UE. The UE needs to send an ACK/NACK for the PDSCH carrying the MAC CE on one of the activated serving cells of the UE. If the PDSCH carrying the MAC CE is successfully decoded, an ACK will be sent (block 904), and this initiates the SCell activation process of the UE; otherwise, if the PDSCH is not successfully decoded, a NACK will be sent, and the gNB will have to transmit another PDSCH carrying the MAC CE on one of the activated serving cells of the UE, and the SCell activation process will start in a slot that an ACK for the another PDSCH is sent. From the reception of the PDSCH with the MAC CE to the sending of the ACK, it may take t slots. The value t may also include other latency that the UE needs to process the MAC CE and take action in L1 layer.

The gNB may transmit an AP TRS to the UE at slot n+t+k_trs, and the UE receives the AP TRS at slot n+t+k_trs (block 906), where k_trs is a triggering offset associated with the UE receiving the AP TRS in terms of number of slots. The AP TRS is transmitted on the SCell to be activated. In this example, the TRS is used as a temporary RS for SCell activation. The AP TRS may be configured for the SCell activation beforehand, and thus no triggering for the TRS is needed, which reduces signaling overhead and latency. In case that multiple AP TRSs are configured for the SCell activation, one of them is configured as the default, and the default AP TRS is sent while other AP TRSs will not be sent. Some embodiments about this have been described previously in the disclosure. The MAC CE may also be enhanced to include a trigger for one of the AP TRSs to be selected. The AP TRS may be repeatedly transmitted within one slot or across different slots.

If the SCell's activation process is also configured with a default AP SRS with a triggering offset k_srs, an AP SRS will also be transmitted by the UE in slot n+t+k_srs (block 908) on the SCell to be activated. The AP SRS may be viewed as a temporary RS for the SCell activation process as it is configured and triggered in an on-demand way for the SCell activation process. The default AP SRS may be identified based on that it is the default AP SRS for the BWP associated with the triggered AP TRS. No triggering for the SRS is needed, which reduces signaling overhead and latency. In an example, it may be preferred to have the SRS to be sent after the TRS so that the tracking achieved from the TRS can be applied to the SRS transmission, and thus generally the network should ensure k_srs>k_trs. In another example, the AP SRS may be sent in slot n+t+k_trs+k_srs, which ensures that the SRS is later than the TRS. If the TRS is transmitted in multiple slots, the AP SRS may be sent in slot n+t+k_trs+k+k_srs, where k is a number of slots with AP TRS transmissions (k is an integer greater than 0) and k may be specified in a RRC configuration or standard, such as k=2, 4, etc., which ensures that the SRS is based on sufficient time-domain samples of the TRS, such as for pathloss estimation purpose discussed later. However, in either case, the time gap between receiving the TRS and sending the SRS can be shorter than the time gap between receiving the TRS and receiving an AP CSI-RS, since the SRS can be sent without waiting for AGC to settle (which is needed for receiving CSI-RS in general). As long as the tracking is acquired by the UE from the AP TRS, the UE is ready to send the SRS. Thus, in an embodiment, the AP SRS slot may be n+t+k_trs+t_srs, where t_srs<k_srs and may be a value specified by the network. For example, t_srs may be 1 slot, i.e., the SRS can be sent in a slot right after the TRS slot if the frame structure allows (e.g., it is an UL slot or a flexible slot with UL symbols). Based on the SRS, the gNB can derive partial DL MIMO CSI for a FDD system, full DL MIMO CSI for a TDD system, and full UL MIMO CSI and UL power control/timing advance information for a FDD/TDD system. The slot that the SRS is sent can be viewed as the time that the SCell activation is completed, i.e., the SCell is activated (block 910), if no default AP CSI-RS is configured for the SCell activation.

Note that if a default AP CSI-RS is also configured/identified for the SCell activation process, the UE should also receive an AP CSI-IM resource, which may be after the TRS, before or after the CSI-RS, but the SCell activation is done before the AP CSI report is sent, that is, the SRS-based CSI acquisition and SCell activation could be faster than the CSI-RS based CSI acquisition and SCell activation. However, in some cases, the UL slots/symbols are sparse in time, and the SRS-based activation may be slower. Comparing the SRS-based activation and CSI-RS based activation, depending on how the slots/parameters are configured and at what time the activation command is sent, one could be faster than the other, which is known to the gNB and the gNB can choose. In addition, if the gNB needs CQI and/or DL interference information, the CSI-RS based activation can provide such information and can be used. If the gNB needs DL full MIMO CSI, UL CSI/TA/power control information but not DL interference information, the SRS based activation can provide such information and can be used; the activation is done after the SRS is sent, but a CSI report may still be sent after the activation is done. The AP TRS may rely on a cross-carrier signal, for example, the AP TRS may be QCLed with a cross-carrier SSB or a cross-carrier P/SP TRS with QCL Type A and QCL Type D (for FR2). The cross-carrier SSB or P/SP TRS should be on an activated carrier which is generally an intra-band carrier, and should be configured for or received by the UE before the activation process starts. In another embodiment, in case of the cross-carrier SSB or P/SP TRS not configured or not transmitted as that carrier may also be deactivated, the AP TRS may be repeatedly transmitted in consecutive slots after slot n+k_trs so that the UE can derive sufficient tracking information from the AP TRS.I If the AP TRS is QCLed with a P/SP TRS, the P/SP TRS may automatically starts after the SCell activation is completed, given that the P/SP TRS is configured with the AP TRS. The UE may then receive the P/SP TRS linked to the AP TRS (block 912).

Figure 10:
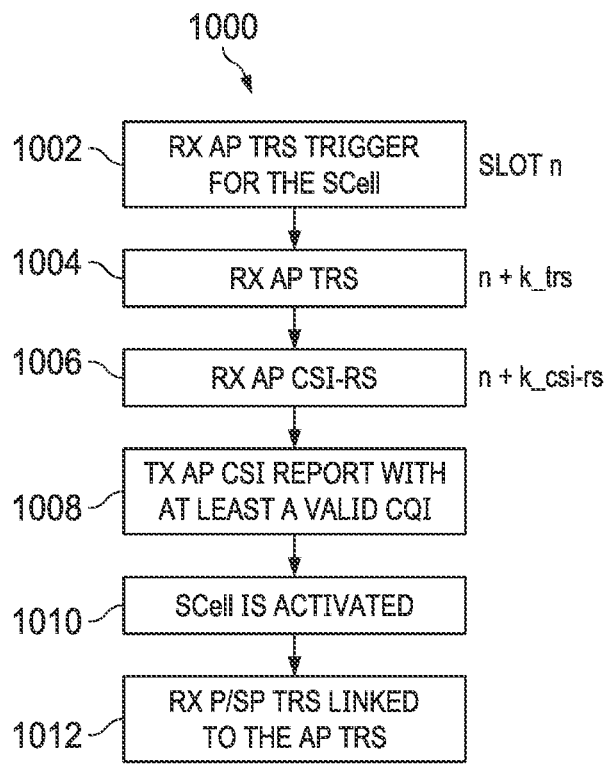
FIG. 10 illustrates a diagram of a fourth example embodiment for SCell activation.
Figure 11:
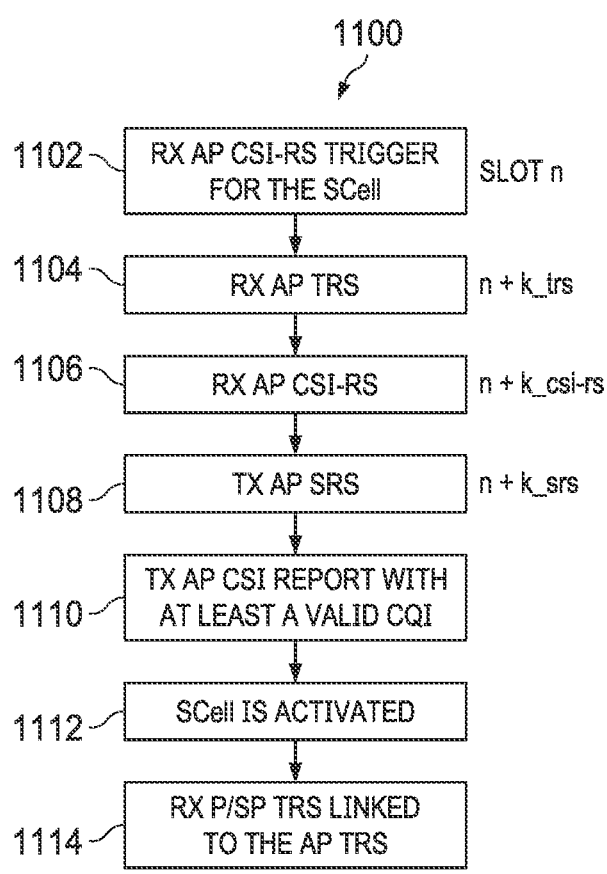
FIG. 11 illustrates a diagram of a fifth example embodiment for SCell activation.

FIG. 10 illustrates a diagram 1000 of a fourth example embodiment for SCell activation triggering and activation. In this example of FIG. 10, a gNB sends an AP TRS trigger for a SCell (that is deactivated) in slot n to an UE, and the UE receives the AP TRS trigger (trigging an AP TRS) in slot n (block 1002). In this example, the TRS is used as a temporary RS for SCell activation. The AP TRS and its triggering information may be configured for the SCell beforehand. In case that multiple AP TRSs are configured for the SCell activation and one default AP TRS is configured, the AP TRS trigger may indicate one AP TRS different from the default. The AP TRS trigger may be carried in a PDCCH sent on an activated serving cell. If the PDCCH with the AP TRS trigger is successfully decoded, the UE understands that this TRS is on a deactivated SCell, which means that the gNB initiates the SCell activation process from slot n. Then the gNB may transmit the AP TRS to the UE in slot n+k_trs on the SCell to be activated and the UE receives the AP TRS in slot n+k_trs (block 1004), where k_trs is a triggering offset associated with the UE receiving an AP TRS in terms of number of slots. This could be related to UE capability, and after the UE reports the capability, the gNB may configure the AP TRS triggering offset. This allows the UE to have sufficient time to prepare for receiving the AP TRS. The AP TRS trigger may be carried in a L1 signaling or a L2 signaling. Though the SCell activation process is generally a L2 process, the reception of the AP TRS trigger, interpretation of the trigger information, and reception of the AP TRS for the SCell activation process can be pre-prepared by the UE in L1, and the UE does not have to wait for L2 to be ready. Nevertheless, the L1 of the UE has to inform the L2 of the reception of the AP TRS trigger if the trigger is in a L1 signaling, which may take some time, and the informing may be done in parallel to the performing of the AP TRS triggering process, that is, the TRS triggering offset may overlap with the L1-to-L2 processing (informing), and the latter may not cause any additional latency in L1 processing of the RS transmissions/receptions/processing. Based on the received AP TRS, the UE can perform AGC settling, time/frequency tracking, and other functionalities. The AP TRS may be repeatedly transmitted within one slot or across different slots.

If the SCell's activation process is also configured with a default AP CSI-RS with a triggering offset k_csi-rs, an AP CSI-RS will also be transmitted to the UE in slot n+k_csi-rs (on the SCell to be activated) and the UE receives the AP receives the AP CSI-RS in slot n+k_csi-rs (block 1006). No triggering for the CSI-RS is needed, which reduces signaling overhead and latency. The AP CSI-RS may be viewed as a temporary RS for the SCell activation process as it is configured and triggered in an on-demand way for the SCell activation process. In an example, it may be preferred to have the CSI-RS to be received after the TRS so that the AGC/tracking achieved from the TRS can be applied to the CSI-RS reception and processing, and thus generally the network should ensure k_csi-rs>k_trs. In another example, the AP CSI-RS may be sent in slot n+k_trs+k_csi-rs, which ensures that the CSI-RS is later than the TRS. If the TRS is transmitted in multiple slots, the AP CSI-RS may be sent in slot n+t+k_trs+k+k_csi-rs, where k is a number of slots with AP TRS transmissions (k is an integer greater than 1) and k may be specified in a RRC configuration or standard, such as k=2, 4, etc., which ensures that the CSI-RS is based on sufficient time-domain samples of the TRS.

If the SCell's activation process is also configured with a default AP SRS with a triggering offset k_srs, the AP SRS will also be transmitted by the UE in slot n+k_srs on the SCell. The AP SRS may be viewed as a temporary RS for the SCell activation process as it is configured and triggered in an on-demand way for the SCell activation process. No triggering for the SRS is needed, which reduces signaling overhead and latency. It may be preferred to have the SRS to be sent after the TRS so that the tracking achieved from the TRS can be applied to the SRS transmission, and generally the network should ensure k_srs>k_trs. The AP SRS may also be sent in slot n+k_trs+k_srs, which ensures that the SRS is later than the TRS. The CSI-RS may be before the SRS or after the SRS if both are configured, depending on the parameters. Based on the CSI-RS, the UE may generate an AP CSI report, which may include at least a valid CQI indicating that the SCell is successfully activated. Then the UE may send the report to the gNB (block 1008). The slot that the report with the valid CQI is sent can be viewed as the time that the SCell activation is completed, i.e., the SCell is activated (block 1010). One embodiment is that the AP TRS relies on a cross-carrier signal, for example, the AP TRS is QCLed with a cross-carrier SSB or a cross-carrier P/SP TRS with QCL Type A and QCL Type D (for FR2). The cross-carrier SSB or P/SP TRS should be on an activated carrier which is generally an intra-band carrier, and should be configured for or received by the UE before the activation process starts. In another embodiment, in case of the cross-carrier SSB or P/SP TRS not configured or not transmitted as that carrier may also be deactivated, the AP TRS may be repeated in consecutive slots after slot n+k_trs so that the UE can derive sufficient tracking information from the AP TRS. The AP TRS may still be QCLed with a P/SP TRS, and that P/SP TRS automatically starts after the SCell activation is completed given that the P/SP TRS is configured with the AP TRS. The UE may then receive the P/SP TRS linked to the AP TRS (block 1012).

Figure ii illustrates a diagram 1100 of a fifth example embodiment for SCell activation triggering and activation. In this example of FIG. 11, a gNB sends an AP CSI-RS trigger (triggering an AP CSI-RS) for a deactivated SCell in slot n to a UE, and the UE receives the AP CSI-RS in slot n (block 1102). In this example, the CSI-RS is used as a temporary RS for SCell activation. The AP CSI-RS and its triggering information may be configured for the SCell beforehand. In case that multiple AP CSI-RSs are configured for the SCell activation and one default AP CSI-RS is configured, the AP CSI-RS trigger can indicate one AP CSI-RS different from the default. The AP CSI-RS trigger may be carried in a PDCCH sent on an activated serving cell. If the PDCCH with the AP CSI-RS trigger is successfully decoded, the UE understands that this CSI-RS is on a deactivated SCell, and this means that the gNB initiates the SCell activation process from slot n. The gNB may then transmit an AP TRS to the UE in slot n+k_trs on the SCell to be activated and the UE receives the AP TRS in slot n+k_trs (block 1104), where k_trs is a triggering offset associated with UE receiving an AP TRS in terms of number of slots, and the AP TRS is configured for the SCell beforehand. The AP TRS is also a temporary RS for the SCell activation process. No triggering for the TRS is needed, which reduces signaling overhead and latency. The AP CSI-RS trigger may be carried in a L1 signaling or a L2 signaling. There may be some L1-to-L2 processing as discussed above with respect to FIG. 10, but the L1-to-L2 processing may be done in parallel with the L1 steps and may not cause any additional latency in L1 processing of the RS transmissions/receptions/processing. Based on the received AP TRS, the UE can perform AGC settling, time/frequency tracking, and so on. The AP TRS may be repeated within one slot or across different slots.

The AP CSI-RS may be transmitted to the UE in slot n+k_csi-rs (block 1106) on the SCell. It may be preferred to have the CSI-RS to be received after the TRS so that the AGC/tracking achieved from the TRS can be applied to the CSI-RS reception and processing, and so generally the network should ensure k_csi-rs>k_trs. The AP CSI-RS may also be sent in slot n+k_trs+k_csi-rs, which ensures that the CSI-RS is later than the TRS. If the TRS is transmitted in multiple slots, the AP CSI-RS may be sent in slot n+t+k_trs+k+k_csi-rs, where k is a number of slots with AP TRS transmissions (k is an integer greater than 1) and k may be specified in a RRC configuration or standard, such as k=2, 4, etc., which ensures that the CSI-RS is based on sufficient time-domain samples of the TRS.

If the SCell's activation process is also configured with a default AP SRS with a triggering offset k_srs, an AP SRS will also be transmitted by the UE in slot n+k_srs (block 1108) on the SCell. The AP SRS may be viewed as a temporary RS for the SCell activation process as it is configured and triggered in an on-demand way for the SCell activation process. No triggering for the SRS is needed, which reduces signaling overhead and latency. It may be preferred to have the SRS to be sent after the TRS so that the tracking achieved from the TRS can be applied to the SRS transmission, and so generally the network should ensure k_srs>k_trs. The AP SRS may also be sent in slot n+k_trs+k_srs, which ensures that the SRS is later than the TRS. The CSI-RS may be before the SRS or after the SRS if both are configured, depending on the parameters. Based on the CSI-RS, the UE may generate AP CSI report, which may include at least a valid CQI indicating that the SCell is activated. Then the UE may send the report the gNB (block 1110). The slot that the report with the valid CQI is sent can be viewed as the time at which the SCell activation is completed, i.e., the SCell is activated (block 1112). Note that even if the SRS is sent before the CSI-RS, in the case of the SCell activation initiated by the AP CSI-RS trigger (as shown in this example of FIG. 11), the activation is done only after the CSI report is sent. One embodiment is that the AP TRS relies on a cross-carrier signal, for example, the AP TRS may be QCLed with a cross-carrier SSB or a cross-carrier P/SP TRS with QCL Type A and QCL Type D (for FR2). The cross-carrier SSB or P/SP TRS should be on an activated carrier which is generally an intra-band carrier, and should be configured for or received by the UE before the activation process starts. In another embodiment, in case of the cross-carrier SSB or P/SP TRS not configured or not transmitted as that carrier may also deactivated, the AP TRS may be repeated in consecutive slots after n+k_trs so that the UE can derive sufficient tracking information from the AP TRS. The AP TRS may still be QCLed with a P/SP TRS, and that P/SP TRS may automatically start after the SCell activation is completed given that the P/SP TRS is configured with the AP TRS. The UE may then receive the P/SP TRS linked to the AP TRS (block 1114).

Figure 12:
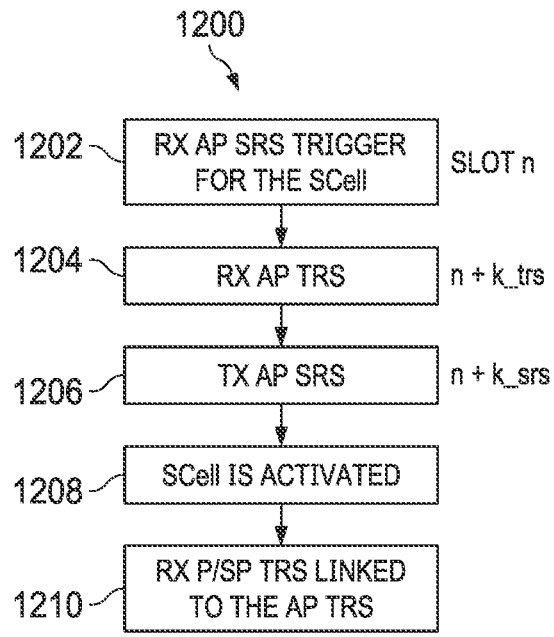
FIG. 12 illustrates a diagram of a sixth example embodiment for SCell activation.

FIG. 12 illustrates a diagram 1200 of a sixth example embodiment for SCell activation triggering and activation. In this example of FIG. 12, a gNB sends, to a UE, an AP SRS trigger (triggering an AP SRS) for a deactivated SCell in slot n, and the UE receives the AP SRS in slot n (block 1202). In this example, the AP SRS is used as a temporary RS for SCell activation. The AP SRS and its triggering information may be configured for the SCell beforehand. In case that multiple AP SRSs are configured for the SCell activation and one default AP SRS is configured, the AP SRS trigger can indicate one AP SRS different from the default. The AP SRS trigger may be carried in a PDCCH sent on an activated serving cell. If the PDCCH carrying the AP SRS trigger is successfully decoded, the UE understands that this SRS is on a deactivated SCell, and this means that the gNB initiates the SCell activation process from slot n. The gNB may then transmit an AP TRS to the UE in slot n+k_trs on the SCell to be activated and the UE receives the AP TRS in slot n+k_trs (block 1204), where k_trs is a triggering offset associated with UE receiving an AP TRS in terms of number of slots, and the AP TRS may be configured for the SCell beforehand. The AP TRS is also a temporary RS for the SCell activation process. No triggering for the TRS is needed, which reduces signaling overhead and latency. The AP SRS trigger may be carried in a L1 signaling or a L2 signaling. There may be some L1-to-L2 processing as discussed above with respect to FIG. 10, but the L1-to-L2 processing may be done in parallel with the L1 steps and may not cause any additional latency in L1 processing of the RS transmissions/receptions/processing. Based on the received AP TRS, the UE can perform AGC settling, time/frequency tracking, etc. The AP TRS may be repeatedly sent within one slot or across different slots.

The AP SRS may be transmitted by the UE in slot n+k_srs (block 1206) on the SCell. It may be preferred to have the SRS to be sent after the TRS so that the tracking achieved from the TRS can be applied to the SRS transmission, and so generally the network should ensure k_srs>k_trs. The AP SRS may also be sent in slot n+k_trs+k_srs, which ensures that the SRS is later than the TRS. If the TRS is transmitted in multiple slots, the AP SRS may be sent in slot n+t+k_trs+k+k_srs, where k is a number of slots with AP TRS transmissions (k is an integer greater than 1) and k may be specified in a RRC configuration or standard, such as k=2, 4, etc., which ensures that the SRS is based on sufficient time-domain samples of the TRS, such as for pathloss estimation purpose discussed later.

If the SCell's activation process is also configured with a default AP CSI-RS with a triggering offset k_csi-rs, an AP CSI-RS will also be transmitted to the UE in slot n+k_csi-rs on the SCell. The AP CSI-RS may be viewed as a temporary RS for the SCell activation process. It may be preferred to have the CSI-RS to be received after the TRS so that the AGC/tracking achieved from the TRS can be applied to the CSI-RS reception and processing, and so generally the network should ensure k_csi-rs>k_trs. The AP CSI-RS may also be sent in slot n+k_trs+k_csi-rs, which ensures that the CSI-RS is later than the TRS. The CSI-RS could be before the SRS or after the SRS if both are configured, depending on the parameters. Based on the CSI-RS, the UE will generate an AP CSI report, which may include at least a valid CQI indicating that the SCell is activated. Then the UE will send the report to the gNB. The slot that the AP SRS is sent can be viewed as the time that the SCell activation is completed, i.e., the SCell is activated. Thus, when the AP SRS is sent, the SCell is activated (block 1206). Note that even if the SRS is sent after the CSI-RS, in the case of SCell activation initiated by an AP SRS trigger, the activation is done only after the SRS is sent.

One embodiment is that the AP TRS relies on a cross-carrier signal, for example, the AP TRS may be QCLed with a cross-carrier SSB or a cross-carrier P/SP TRS with QCL Type A and QCL Type D (for FR2). The cross-carrier SSB or P/SP TRS should be on an activated carrier which is generally an intra-band carrier, and should be configured for or received by the UE before the activation process starts. In another embodiment, in case of the cross-carrier SSB or P/SP TRS not configured or not transmitted as that carrier may also be deactivated, the AP TRS may be repeated in consecutive slots after n+k_trs so that the UE can derive sufficient tracking information from the AP TRS. The AP TRS may still be QCLed with a P/SP TRS, and that P/SP TRS may automatically start after the SCell activation is completed given that the P/SP TRS is configured with the AP TRS. The UE may then receive the P/SP TRS linked to the AP TRS (block 1208).

Table 1 below illustrates criteria for a deactivated SCell to be considered as activated in the above embodiments. Table 1 shows 4 different activation signaling that may be used to trigger SCell activation: MAC CE, AP TRS trigger, AP CSI-RS trigger and AP SRS trigger, listed in four columns. There are 4 possibilities in each column, listed as sub-columns, corresponding to cases of whether default AP CSI-RS is configured for SCell activation and whether default AP SRS is configured for SCell activation. "N/A" indicates an invalid configuration. The last row shows what is sent to indicate activation of a SCell. Note that an AP temporary RS trigger may or may not indicate a default RS.

And If Default AP SRS configured for SCell activation or not is: Yes

Then SCell is activated when this is sent: CQI

Other sub-columns can also be understood likewise.

Some embodiments for the CSI reporting associated with the SCell activation are provided as follows. In one embodiment, the CSI report includes at least a valid CQI report, which is the same as the legacy design. In one embodiment, the CSI report includes at least a valid L1 SINR report but not necessarily a CQI. The derivation of the L1 SINR is simpler and faster than derivation of the CQI value, and can therefore shorten the activation latency. Both the CQI report and the L1 SINR report have to rely on CSI-RS (and CSI-IM resource(s)) as described later. The SCell activation completes when the L1 SINR is sent. To differentiate the cases of sending a CQI and sending a L1 SINR, one embodiment is that all Rel-17 enhanced activation requires L1 SINR but not CQI; or alternatively, for L2 command initiated activation, CQI is to be sent, and for L1 RS trigger initiated activation, L1 SINR is to be sent. In another embodiment, the CSI report includes a valid L1 RSRP report but not necessarily a SINR or CQI. This is especially useful for FR2 beam-based operations. The derivation of the L1 RSRP is even simpler and faster than derivation of the L1 SINR value, and can therefore further shorten the activation latency. The L1 RSRP report relies on CSI-RS but not CSI-IM resource(s). So if no default CSI-IM is configured or no CSI-IM is signaled in an AP RS trigger, the UE may assume that a L1 RSRP is to be reported, and the SCell activation completes when the L1 RSRP is sent. Also for L2 command initiated activation, CQI is to be sent, and for L1 RS trigger initiated activation, L1 RSRP is to be sent if no CSI-IM is available, but L1 SINR is to be sent if CSI-IM is also available.

The SRS transmission may need to have a proper TA offset. In some embodiments, a TA offset may be determined or obtained for the SRS transmission for the SCell activation. As an example, the TA offset may be based on the TAG that the SCell is in, if the TA is valid for that TAG. If no valid TA is available for the TAG, then an initial TA offset may be obtained from another TAG, possibly with an offset signaled

TABLE 1

| Activation signaling: | MAC CE | | | | AP TRS trigger | | | | AP CSI-RS trigger | | | | AP SRS trigger | | | |
|---|---|---|---|---|---|---|---|---|---|---|---|---|---|---|---|---|
| Default AP CSI-RS configured for SCell activation or not: | Yes | Yes | No | No | Yes | Yes | No | No | Yes | Yes | No | No | Yes | Yes | No | No |
| Default AP SRS configured for SCell activation or not: | Yes | No | Yes | No | Yes | No | Yes | No | Yes | No | Yes | No | Yes | No | Yes | No |
| SCell activated when this is sent: | CQI | CQI | SRS | N/A | CQI | CQI | SRS | N/A | CQI | CQI | N/A | N/A | SRS | N/A | SRS | N/A |

The example of the first sub-column shown in Table 1 is:

If Activation signaling is: MAC CE

And If Default AP CSI-RS configured for SCell activation or not is: Yes from the network for the timing differences between the TAGs estimated by the network.

The SRS transmission may also need to have a proper transmission power. In some embodiments, the pathloss RS for the SRS may be configured as a SSB, CSI-RS, or TRS.

If the SSB is available and configured as the pathloss RS for the SRS, then the pathloss can be estimated from the SSB. If the CSI-RS is available as an AP CSI-RS and configured as the pathloss RS for the SRS transmission, then the pathloss can be estimated from the AP CSI-RS. In an example, the network may configure the pathloss (or the associated RSRP measurement) based on at least k transmission occasions of the AP CSI-RS. The k transmission occasions may be on k OFDM symbols, k slots, or shorter or longer than k slots based on its configuration and slot configuration, and the AP SRS trigger offset may start in the slot where the k-th transmission is located. If the AP TRS is configured as the pathloss RS for the SRS, then the pathloss can be estimated from the AP TRS. In another example, the network may configure the pathloss (or the associated RSRP measurement) based on at least k transmission occasions of the AP TRS. The k transmission occasions may be on k OFDM symbols, k slots, or shorter or longer than k slots based on its configuration and slot configuration, and the AP SRS trigger offset may start in the slot where the k-th transmission is located. In on embodiment, the AP TRS may be the default pathloss RS for the SRS during the activation procedure even if the SRS is configured with another pathloss RS; this is because the AP TRS is certain to be transmitted while a CSI-RS may be optional, and the AP TRS provides wideband information which is better than a SSB for pathloss estimation purpose. In another embodiment, information from other carriers may be used to set the transmission power of the SRS. For example, the pathloss for SCell 1 may be derived from the pathloss for another cell, with an offset signaled to the UE or derived by the UE. If SCell 1 is in a TAG with an activated serving cell, then in addition to acquiring TA information from that activated serving cell, the UE may also be able to acquire initial pathloss/RSRP values from that activated serving cell with proper signaling from the network. As an example, if an offset between a first cell and a second cell for pathloss/RSRP is signaled and one of the cells is activated, the UE may apply the offset for pathloss/RSRP to estimate the pathloss/RSRP for the other cell and hence the initial SRS power control. As another example, the network signaling may not have an offset, but may enable derivation of the pathloss/RSRP from the activated serving cell (possibly with an offset estimated by the UE).

In some embodiments, fast SCell activation may be achieved via existing L2 signaling with enhanced activation procedure, which may be variations of some of the above described embodiments or may be combined with above described embodiments. For example, a SCell activation procedure is initiated when UE receives the L2 signaling. A temporary RS is triggered with the L2 signaling, with a triggering offset started in a slot according to the required MAC decoding time (typically n+3), or with a triggering offset started in a slot where an ACK to a PDSCH carrying a MAC command is sent. The temporary RS may include at least an AP TRS configured for the SCell activation, and include at least one of an AP CSI-RS and an AP SRS (or both).

In some embodiments, fast SCell activation may be achieved via L1 or L2 signaling. In any case, an AP TRS is always triggered. In one example embodiment, a gNB sends a MAC activation command for the SCell activation, which is configured with a default AP TRS plus a default AP CSI-RS and/or a default AP SRS. The triggering offset for the AP RS may start in a slot according to the required MAC decoding time (typically n+3); or the triggering offset may start in a slot when the UE sends an ACK associated with the MAC activation command.

In another example embodiment, the network (NW), e.g., a gNB, sends an L1 AP TRS trigger for a deactivated SCell, which may be configured jointly with a default AP CSI-RS and/or a default AP SRS. The triggered AP TRS may or may not be the default AP TRS configured for the SCell activation.

In another example embodiment, the NW sends an L1 AP CSI-RS trigger for the deactivated SCell, which may be configured jointly with a default AP TRS, and the AP CSI-RS triggered may be different from the default AP CSI-RS configured for the SCell activation. The SCell may also be configured with a default SRS, and the default SRS is also transmitted.

In another example embodiment, the NW sends an L1 AP SRS trigger for the deactivated SCell, which may be configured jointly with a default AP TRS, and the AP SRS triggered may be different from the default AP SRS configured for the SCell activation. The SCell may also be configured with a default CSI-RS, and the triggered AP SRS is also transmitted.

In some embodiments using a L1 AP trigger for activation of a deactivated SCell, to prevent a UE and the network from being out of sync, an ACK to the L1 triggering PDCCH (i.e., the L1 triggering signaling) may be sent from the UE if the PDCCH is correctly decoded. The ACK may be carried in a PUCCH in the immediately next slot that has UL symbols to accommodate the PUCCH. In this case, the triggering offset starting time (of a triggered RS) may be the slot of the PUCCH. In this example, the L1 triggering process may be prolonged since it may have to wait for a flexible/UL slot in TDD.

In addition to TRS which has been agreed as a temporary RS, the following candidate RS can be considered:

Periodic CSI-RS for a deactivated SCell

In essence, periodic CSI-RS (or likewise, SP CSI-RS) acts like LTE CRS and thus can shorten the activation latency. The pros include that their occurrences are fully predictable, which can help reduce PDCCH monitoring and PDCCH overhead, and simplify UE design. However, it may be difficult to set the periodicity. If the periodicity is too long, then the latency reduction is not significant, but if the periodicity is too short, then the overhead and energy consumption are high. Long-periodicity CSI-RS (also including long-periodicity TRS) having periodicity of at least 100 TIIs may be configured for a deactivated SCell to reduce energy consumption. The P/SP TRS configured for the deactivated SCell may also serve as the source RS for the AP TRS during the activation process. If multiple AP TRSs are configured for the SCell activation, the AP TRS associated with the P/SP TRS transmitted before the activation starts may be assumed as the default AP TRS and will be transmitted during the activation.

Aperiodic CSI-RS for a deactivated SCell during activation

Aperiodic CSI-RS is more flexible and can be triggered right when the activation procedure starts. If one transmission is not enough, multiple aperiodic CSI-RSs can be triggered (e.g., via one trigger if overhead reduction is considered). The energy consumption associated with receiving the aperiodic CSI-RS is lower than receiving periodic CSI-RS, and especially when the deactivation duration is long and the periodicity is short. With a sufficient triggering offset, the UE does not have to be ready for receiving an aperiodic CSI-RS and generating an aperiodic CSI-RS report all the time. The triggering offset can allow enough time for the UE to respond to the aperiodic trigger. However, additional PDCCH monitoring and overhead on another serving cell may be needed. If many SCells are deactivated, PDCCH monitoring on those activated serving cells can become significant.

A Combination of P/AP CSI-RS for a deactivated SCell

This provides the network with the most flexibility/capability, but the complexity may be high. Comparing CSI-RS with TRS, it is noted that CSI-RS is needed for CSI measurement, while TRS is for tracking. In almost all cases of SCell activation, CSI measurement and reporting are needed, and even when TRS is used as a temporary RS for activation, CSI-RS is still needed. Thus, at least one of AP CSI-RS and P/SP CSI-RS may need to be supported as temporary RS. A combination of long-periodicity P/SP CSI-RS and AP CSI-RS may be able to achieve the generally best tradeoff between fast activation and reduced UE power consumption.

SRS for a deactivated SCell during activation

It is known that SRS can be useful for providing DL full MIMO CSI in TDD systems, UL CSI in TDD/FDD systems, maintaining UL TA, UL power control, and UL/DL beams. Therefore, SRS can be very important for a to-be-activated SCell to re-acquire CSI, TA, power control, and beams. In a case that the pathloss RS for the SRS is in an activated cell, a UE may be able to transmit the SRS on the to-be-activated SCell without waiting for the DL AGC of the to-be-activated SCell to settle. A SCell may not be fully usable as a "fully activated" SCell until its UL is also ready, which can be achieved by SRS transmissions. In addition, utilizing SRS in activation can shift some of the processing from the UE to the network, thus reducing UE processing complexity. Hence, it is proposed that SRS is also considered as a temporary RS.

RS based on SSS/PSS during activation

A to-be-activated SCell may be known to a UE or unknown to the UE. If it is known, using the TRS as a temporary RS can provide the UE with at least the functionalities associated with the TRS, such as time/frequency tracking during activation. If the SCell is not known, however, the TRS may not be sufficient, and RS based on SSS/PSS may be needed. Thus, a RS based on SSS/PSS may need to be considered as a temporary RS for unknown cells to be activated.

To prevent a SCell from becoming unknown to a UE, periodic RS based on SSS/PSS may be configured for a deactivated SCell. In addition, if lower power consumption is intended, long-periodicity RS based on SSS/PSS having periodicity of at least 100 TIIs may be configured for a deactivated SCell.

In some embodiments, when a deactivated SCell becomes unknown to a UE, aperiodic triggering of RS based on SSS/PSS may be sent. However, due to the timing uncertainty, the precise timing of the RS based on the SSS/PSS may not be known to the UE. Hence, a search time window for the RS based on the SSS/PSS may be configured or signaled to the UE for activation of an unknown SCell. For example, if the search time window is x OFDM symbols or x slots or x microseconds, and the triggering offset for the RS is k slots, then the UE may perform a search for the RS after the RS trigger is received, and the search starts after the k slots and ends before the k+x slots. The RS may be repeated multiple times in a slot or in multiple slots based on the configuration to the UE. After the RS based on the SSS/PSS is sent for l times, where l is value configured for the UE, the rest of the activation process starts similarly to the embodiments described above for a known cell.

Thus, AP CSI-RS, P/SP CSI-RS, SRS, and RS based on SSS/PSS may be configured as temporary RSs. Note that the temporary RS may not be always needed for activation, and whether or not a specific temporary RS is supported/used may depend on network configuration/UE capability.

In embodiments that AP CSI-RSs are transmitted, each AP CSI-RS may also be configured with an AP CSI-IM resource(s), and the AP CSI-IM resource(s) may also be transmitted when the AP CSI-RS is transmitted. Therefore, the AP CSI-IM resource(s) may be viewed as a part of a temporary RS or a temporary RS resource. In some embodiments, the L1 AP CSI-RS trigger may be replaced by a L1 AP CSI trigger. An AP CSI trigger triggers a combination of an AP CSI-RS(s) and an AP CSI-IM resource(s), and a CQI and/or L1 SINR is to be reported according to the CSI-RS/CSI-IM. The timing relation among the AP CSI trigger, the AP CSI-RS, the AP CSI-IM, and the AP CSI report is generally the same as what is conventionally known, but in some embodiments, to ensure that the AP CSI-RS/CSI-IM are after the AP TRS, the triggering offset(s) for the AP CSI-RS/CSI-IM may begin with the first or last AP TRS slot.

Figure 13:
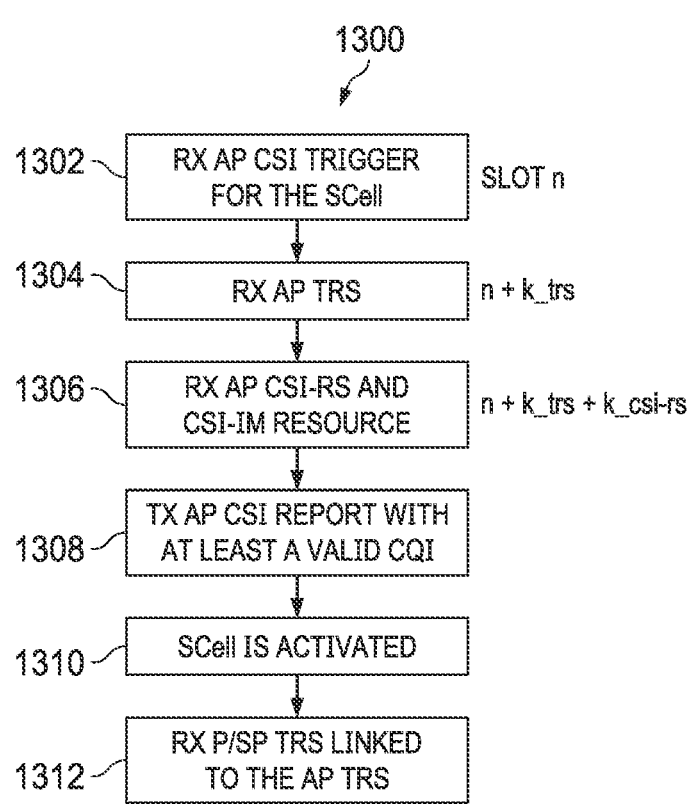
FIG. 13 illustrates a diagram of a seventh example embodiment for SCell activation.

FIG. 13 illustrates a diagram 1300 of a seventh example embodiment for SCell activation triggering and activation. In the example of FIG. 13, a gNB sends, to a UE, an AP CSI reporting trigger for a SCell (that is deactivated) in slot n, and the UE receives the AP CSI reporting trigger (trigging a combination of an AP CSI-RS and an AP CSI-IM resource) in slot n (block 1302). In this example, the CSI-RS is used as a temporary RS for SCell activation. The AP CSI reporting trigger may be carried in a L1 signaling or a L2 signaling. The AP CSI-RS and the AP CSI-IM resource and related triggering information may be configured for the SCell beforehand. The gNB may transmit an AP TRS to the UE in slot n+k_trs and the UE receives the AP TRS in slot n+k_trs (block 1304), where k_trs is a triggering offset associated with the UE receiving an AP TRS in terms of number of slots. The UE receives the AP CSI-RS and the AP CSI-IM resource in slot n+k_trs+k_csi-rs (block 1306). k_csi-rs is a triggering offset of the CSI-RS. Based on the CSI-RS, the UE may perform CSI measurement and generate an AP CSI report, which may include at least a valid CQI indicating that the SCell is successfully activated. Then the UE may send the report to the gNB (block 1308). The slot in which the report having the valid CQI is sent can be viewed as the time that the SCell activation is completed. The SCell is then activated (block 1310). The UE may also receive P/SP TRS linked to the AP TRS (block 1312).

As discussed above, TRS has been selected as a temporary RS for SCell activation. The design of Rel-15/16 TRS structure and configuration seems generally sufficient and may be reused as much as possible for Rel-17. When utilizing TRS for SCell activation, the network need ensure that the RS/SSB that the TRS is QCLed with (i.e., the source RS for TRS) should be present and valid for a UE to use. For example, if the TRS's source RS is SSS/PSS and the SCell is unknown to the UE, then the network should make sure that the SSS/PSS is transmitted to the UE before the TRS is sent. With proper network implementation/configuration, the existing TRS design should work fine for SCell activation. As described before, the TRS trigger may also serve as the SCell activation command, which may not need a new design of the triggering command. Some embodiments of the AP TRS have been provided before in the present disclosure. In addition, the AP TRS may also be a cross-carrier TRS for the to-be-activated SCell. In this case, the P/SP/AP TRS is on an activated serving cell, and the P/SP TRS is being constantly monitored by the UE. The periodicity may be long (such as longer than 100 TTIs) to reduce overhead, and the AP TRS is on the activated cell based on a MAC command for activation or a L1 RS trigger for activation. The previous embodiment procedures can still work, except that in the case that the L1 AP TRS trigger is used, additional information may be required for the UE to determine if the L1 AP TRS trigger is intended for a cross-carrier SCell activation. An additional indication of the SCell ID may be provided together with the additional information if the AP TRS is also for a cross-carrier SCell activation. Advantages of using the cross-carrier TRS for activation includes that the TRS can be repeated fewer time for the UE to gain sufficient information about tracking and/or pathloss estimate as the P/SP TRS is monitored by the UE, which reduces the latency between the TRS and the CSI-RS/SRS in the next steps. However the AGC information may not be able to be acquired from the cross-carrier TRS. For this reason, the subsequently transmission of CSI-RS may need more repetitions, or the cross-carrier TRS may primarily be used with AP SRS which does not require AGC. That is, an AP SRS trigger is sent to the UE for the SCell activation, and the SRS triggered may be linked to an AP TRS on an activated SCell, and the AP TRS is sent with the TRS triggering offset after the AP SRS trigger and without extra repetitions, based on which the pathloss estimate is updated by the UE, and the AP SRS is sent on the to-be-activated SCell. Then the SCell is considered as activated.

Figure 14:
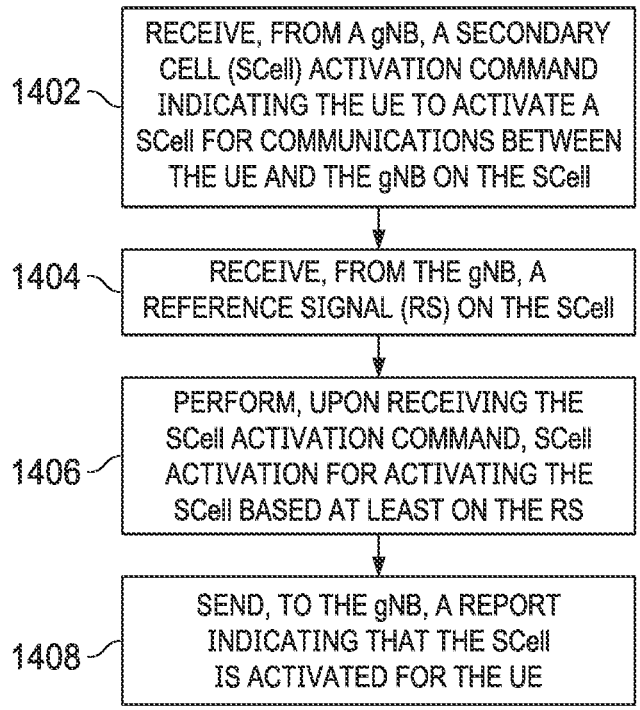
FIG. 14 is a flow diagram illustrating an embodiment wireless communication method.

FIG. 14 is a flowchart of an embodiment wireless communication method 1400. The method 1400 may be indicative of operations performed by a UE. As shown, the UE may receive, from a gNB, a secondary cell (SCell) activation command indicating the UE to activate a SCell for communications between the UE and the gNB on the SCell (block 1402). The UE may receive, from the gNB, a reference signal (RS) on the SCell (block 1404). The RS is configured for activation of the SCell. The UE may perform, upon receiving the SCell activation command, SCell activation for activating the SCell based at least on the RS (block 1406). The UE may send, to the gNB, a report indicating that the SCell is activated for the UE (block 1408).

Figure 15:
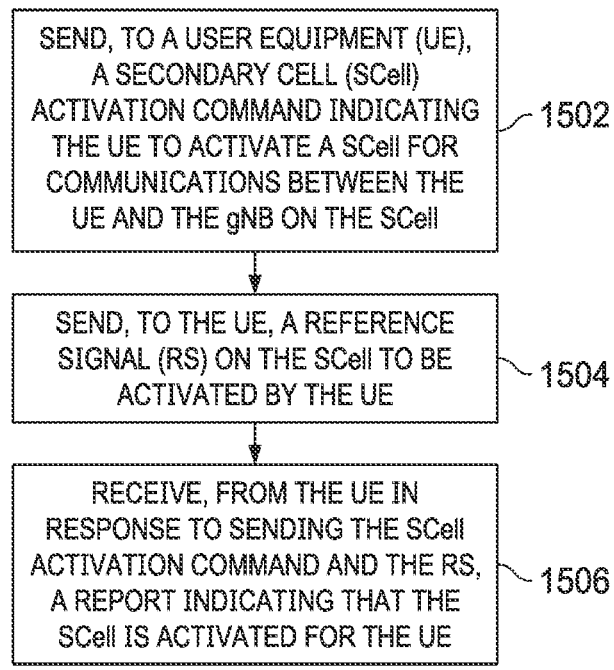
FIG. 15 is a flow diagram illustrating another embodiment wireless communication method.

FIG. 15 is a flowchart of another embodiment wireless communication method 1500. The method 1500 may be indicative of operations performed by a gNB. As shown, the gNB may send, to a user equipment (UE), a secondary cell (SCell) activation command indicating the UE to activate a SCell for communications between the UE and the gNB on the SCell (block 1502). The gNB may send, to the UE, a reference signal (RS) on the SCell to be activated by the UE (block 1504). The RS configured for activation of the SCell. The gNB may receive, from the UE in response to sending the SCell activation command and the RS, a report indicating that the SCell is activated for the UE (block 1506).

Figure 16:
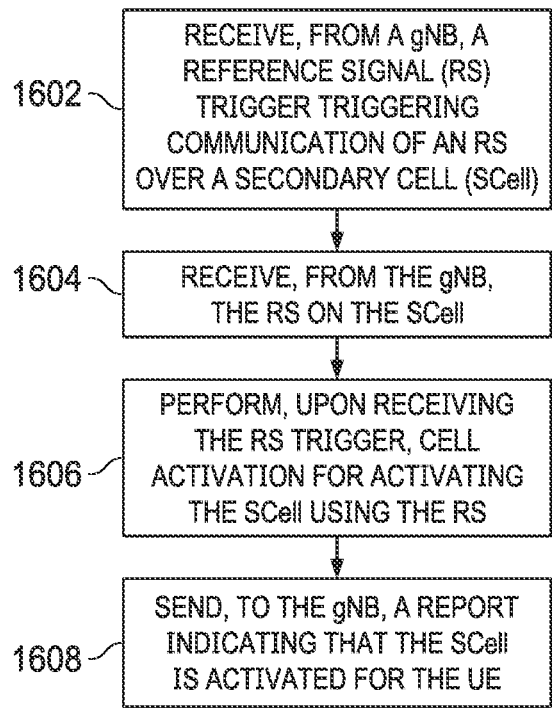
FIG. 16 is a flow diagram illustrating another embodiment wireless communication method.

FIG. 16 is a flowchart of another embodiment wireless communication method 1600. The method 1600 may be indicative of operations performed by a UE. As shown, the UE may receive, from a gNB, a reference signal (RS) trigger triggering communication of a reference signal (RS) over a secondary cell (SCell) (block 1602). The UE receives, from the gNB, the RS on the SCell (block 1604). The RS is configured for activation of the SCell. The UE performs, upon receiving the RS trigger, cell activation for activating the SCell using the RS (block 1606). The UE may send, to the gNB, a report indicating that the SCell is activated for the UE (block 1608).

Figure 17:
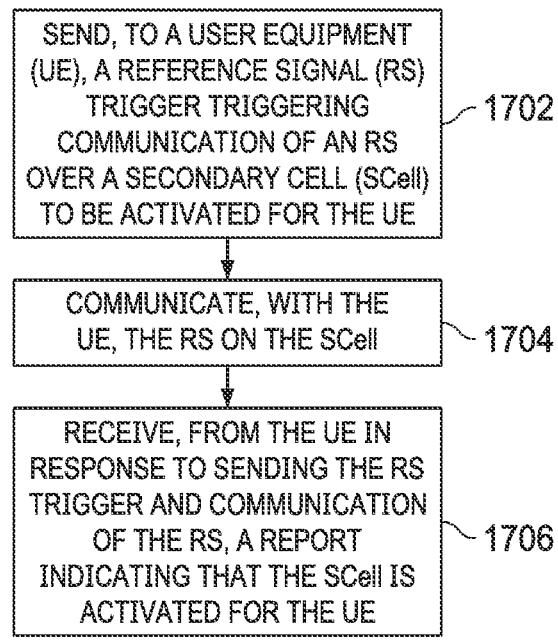
FIG. 17 is a flow diagram illustrating another embodiment wireless communication method.

FIG. 17 is a flowchart of another embodiment wireless communication method 1700. The method 1700 may be indicative of operations performed by a gNB. As shown, the gNB may send, to a user equipment (UE), a reference signal (RS) trigger triggering communication of a reference signal (RS) over a secondary cell (SCell) to be activated for the UE (block 1702). The gNB communicates, with the UE, the RS on the SCell (block 1704). The RS is configured for activation of the SCell. The gNB receives, from the UE in response to sending the RS trigger and communication of the RS, a report indicating that the SCell is activated for the UE (block 1706).

Figure 18:
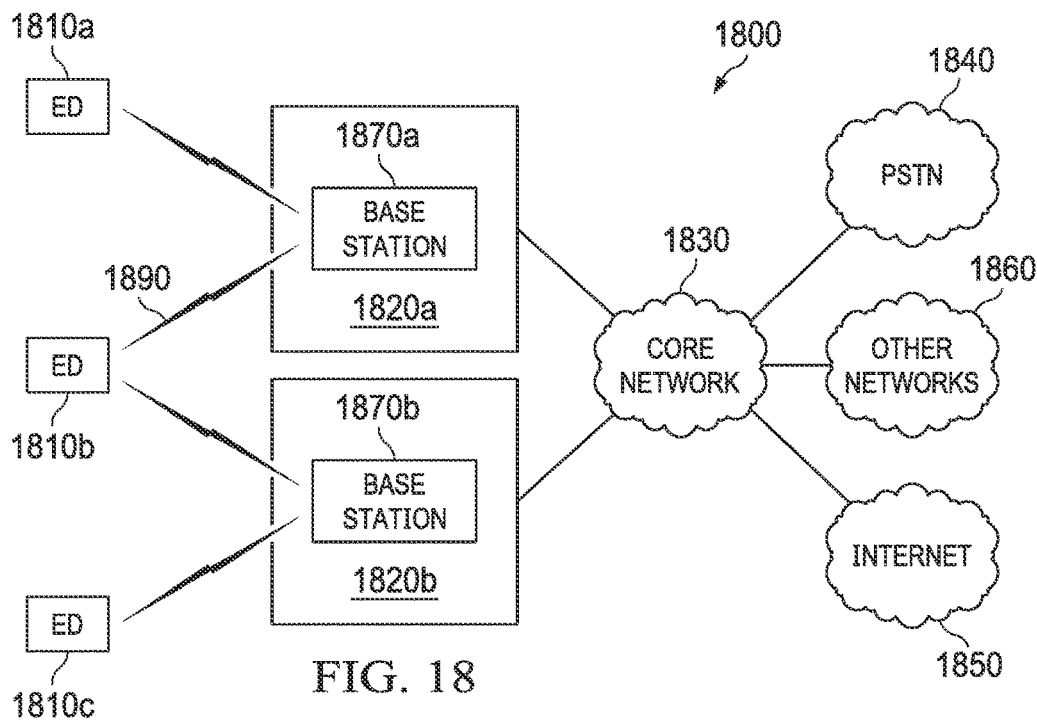
FIG. 18 illustrates a diagram of an example communication system according to example embodiments of the present disclosure.

FIG. 18 illustrates an example communication system 1800. In general, the system 1800 enables multiple wireless or wired users to transmit and receive data and other content. The system 1800 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1800 includes electronic devices (ED) 1810a-1810c, radio access networks (RANs) 1820a-1820b, a core network 1830, a public switched telephone network (PSTN) 1840, the Internet 1850, and other networks 1860. While certain numbers of these components or elements are shown in FIG. 18, any number of these components or elements may be included in the system 1800.

The EDs 1810a-1810c are configured to operate or communicate in the system 1800. For example, the EDs 1810a-1810c are configured to transmit or receive via wireless or wired communication channels. Each ED 1810a-1810c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1820a-1820b here include base stations 1870a-1870b, respectively. Each base station 1870a-1870b is configured to wirelessly interface with one or more of the EDs 1810a-1810c to enable access to the core network 1830, the PSTN 1840, the Internet 1850, or the other networks 1860. For example, the base stations 1870a-1870b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1810a-1810c are configured to interface and communicate with the Internet 1850 and may access the core network 1830, the PSTN 1840, or the other networks 1860.

In the embodiment shown in FIG. 18, the base station 1870a forms part of the RAN 1820a, which may include other base stations, elements, or devices. Also, the base station 1870b forms part of the RAN 1820b, which may include other base stations, elements, or devices. Each base station 1870a-1870b operates to transmit or receive wireless signals within a particular geographic region or area, sometimes referred to as a "cell." In some embodiments, multiple-input multiple-output (MIMO) technology may be employed having multiple transceivers for each cell.

The base stations 1870a-1870b communicate with one or more of the EDs 1810a-1810c over one or more air interfaces 1890 using wireless communication links. The air interfaces 1890 may utilize any suitable radio access technology.

It is contemplated that the system 1800 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1820a-1820b are in communication with the core network 1830 to provide the EDs 1810a-1810c with voice, data, application, Voice over Internet Protocol (VoIP), or other services. Understandably, the RANs 1820a-1820b or the core network 1830 may be in direct or indirect communication with one or more other RANs (not shown). The core network 1830 may also serve as a gateway access for other networks (such as the PSTN 1840, the Internet 1850, and the other networks 1860). In addition, some or all of the EDs 1810a-1810c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1850.

Although FIG. 18 illustrates one example of a communication system, various changes may be made to FIG. 18. For example, the communication system 1800 could include any number of EDs, base stations, networks, or other components in any suitable configuration.

Figure 19A:
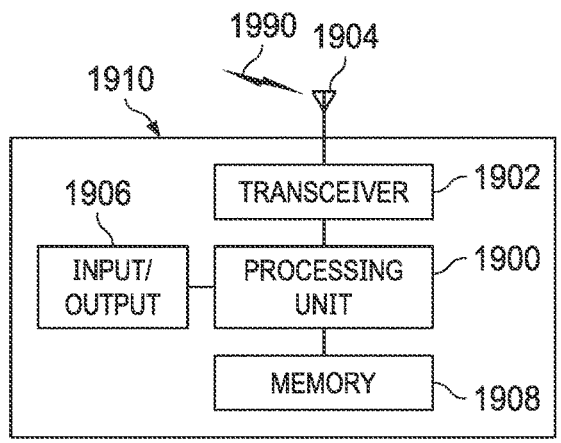
FIGS. 19A and 19B illustrate example embodiment devices that may be used for implementing the embodiments of this disclosure.
Figure 19B:
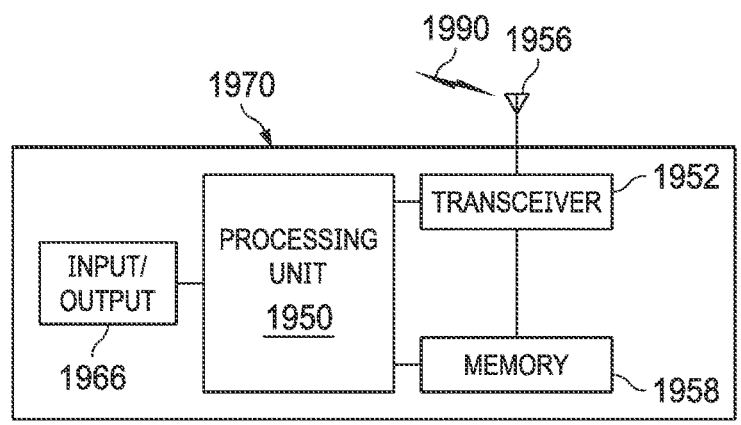

FIGS. 19A and 19B illustrate example devices that may implement the methods and teachings according to this disclosure. In particular, FIG. 19A illustrates an example ED 1910, and FIG. 19B illustrates an example base station 1970. These components could be used in the system 1800 or in any other suitable system.

As shown in FIG. 19A, the ED 1910 includes at least one processing unit 1900. The processing unit 1900 implements various processing operations of the ED 1910. For example, the processing unit 1900 could perform signal coding, data processing, power control, input/output processing, or any other functionality enabling the ED 1910 to operate in the system 1900. The processing unit 1900 also supports the methods and teachings described in more detail above. Each processing unit 1900 includes any suitable processing or computing device configured to perform one or more operations. Each processing unit 1900 could, for example, include a microprocessor, microcontroller, digital signal processor, field programmable gate array, or application specific integrated circuit.

The ED 1910 also includes at least one transceiver 1902. The transceiver 1902 is configured to modulate data or other content for transmission by at least one antenna or NIC (Network Interface Controller) 1904. The transceiver 1902 is also configured to demodulate data or other content received by the at least one antenna 1904. Each transceiver 1902 includes any suitable structure for generating signals for wireless or wired transmission or processing signals received wirelessly or by wire. Each antenna 1904 includes any suitable structure for transmitting or receiving wireless or wired signals 1990. One or multiple transceivers 1902 could be used in the ED 1910, and one or multiple antennas 1904 could be used in the ED 1910. Although shown as a single functional unit, a transceiver 1902 could also be implemented using at least one transmitter and at least one separate receiver.

The ED 1910 further includes one or more input/output devices 1906 or interfaces (such as a wired interface to the Internet 1850). The input/output devices 1906 facilitate interaction with a user or other devices (network communications) in the network. Each input/output device 1906 includes any suitable structure for providing information to or receiving information from a user, such as a speaker, microphone, keypad, keyboard, display, or touch screen, including network interface communications.

In addition, the ED 1910 includes at least one memory 1908. The memory 1908 stores instructions and data used, generated, or collected by the ED 1910. For example, the memory 1908 could store software or firmware instructions executed by the processing unit(s) 1900 and data used to reduce or eliminate interference in incoming signals. Each memory 1908 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 19B, the base station 1970 includes at least one processing unit 1950, at least one transceiver 1952, which includes functionality for a transmitter and a receiver, one or more antennas 1956, at least one memory 1958, and one or more input/output devices or interfaces 1966. A scheduler, which would be understood by one skilled in the art, is coupled to the processing unit 1950. The scheduler could be included within or operated separately from the base station 1970. The processing unit 1950 implements various processing operations of the base station 1970, such as signal coding, data processing, power control, input/output processing, or any other functionality. The processing unit 1950 can also support the methods and teachings described in more detail above. Each processing unit 1950 includes any suitable processing or computing device configured to perform one or more operations. Each processing unit 1950 could, for example, include a microprocessor, microcontroller, digital signal processor, field programmable gate array, or application specific integrated circuit.

Each transceiver 1952 includes any suitable structure for generating signals for wireless or wired transmission to one or more EDs or other devices. Each transceiver 1952 further includes any suitable structure for processing signals received wirelessly or by wire from one or more EDs or other devices. Although shown combined as a transceiver 1952, a transmitter and a receiver could be separate components. Each antenna 1956 includes any suitable structure for transmitting or receiving wireless or wired signals 1990. While a common antenna 1956 is shown here as being coupled to the transceiver 1952, one or more antennas 1956 could be coupled to the transceiver(s) 1952, allowing separate antennas 1956 to be coupled to the transmitter and the receiver if equipped as separate components. Each memory 1958 includes any suitable volatile or non-volatile storage and retrieval device(s). Each input/output device 1966 facilitates interaction with a user or other devices (network communications) in the network. Each input/output device 1966 includes any suitable structure for providing information to or receiving/providing information from a user, including network interface communications.

Figure 20:
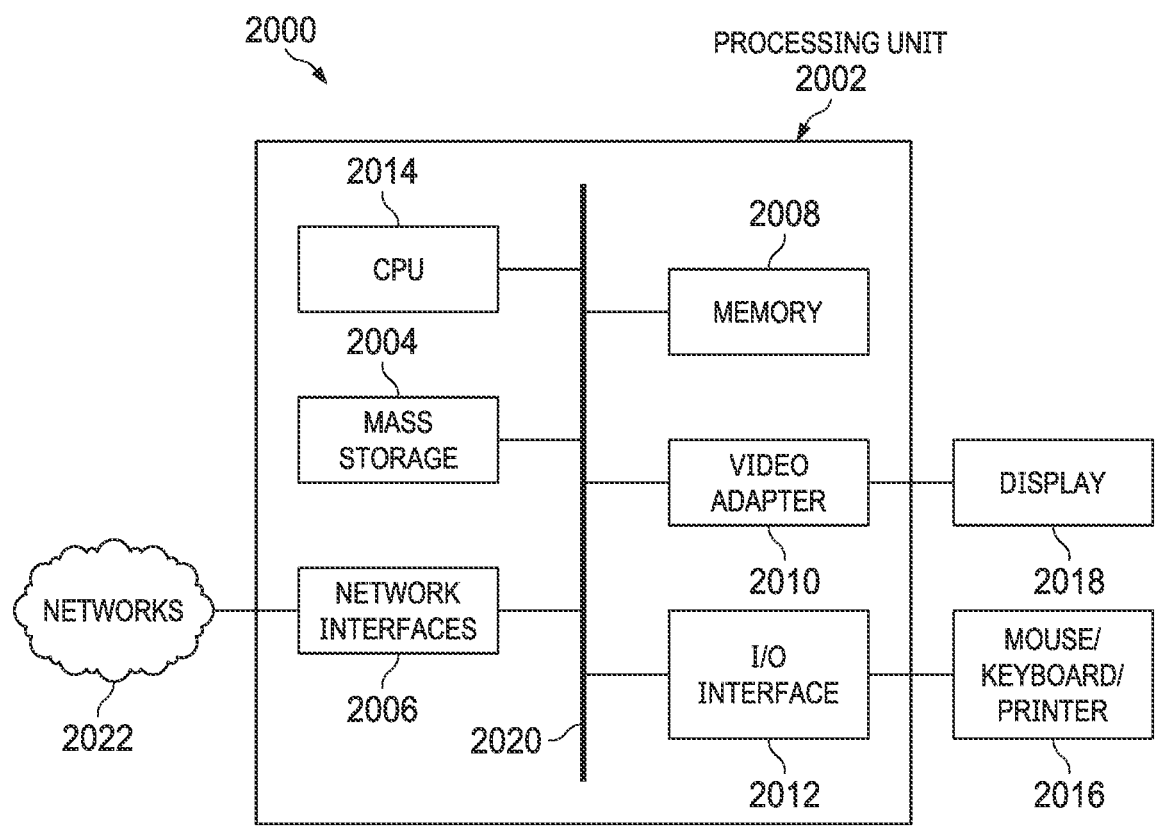
FIG. 20 is a diagram of a computing system that may be used for implementing the embodiments of the present disclosure.

FIG. 20 is a block diagram of a computing system 2000 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 2000 includes a processing unit 2002. The processing unit includes a central processing unit (CPU) 2014, memory 2008, and may further include a mass storage device 2004, a video adapter 2010, and an I/O interface 2012 connected to a bus 2020.

The bus 2020 may be one or more of any type of several bus architectures including a memory bus or memory controller, a peripheral bus, or a video bus. The CPU 2014 may comprise any type of electronic data processor. The memory 2008 may comprise any type of non-transitory system memory such as static random access memory (SRAM), dynamic random access memory (DRAM), synchronous DRAM (SDRAM), read-only memory (ROM), or a combination thereof. In an embodiment, the memory 2008 may include ROM for use at boot-up, and DRAM for program and data storage for use while executing programs.

The mass storage 2004 may comprise any type of non-transitory storage device configured to store data, programs, and other information and to make the data, programs, and other information accessible via the bus 2020. The mass storage 2004 may comprise, for example, one or more of a solid state drive, hard disk drive, a magnetic disk drive, or an optical disk drive.

The video adapter 2010 and the I/O interface 2012 provide interfaces to couple external input and output devices to the processing unit 2002. As illustrated, examples of input and output devices include a display 2018 coupled to the video adapter 2010 and a mouse, keyboard, or printer 2016 coupled to the I/O interface 2012. Other devices may be coupled to the processing unit 2002, and additional or fewer interface cards may be utilized. For example, a serial interface such as Universal Serial Bus (USB) (not shown) may be used to provide an interface for an external device.

The processing unit 2002 also includes one or more network interfaces 2006, which may comprise wired links, such as an Ethernet cable, or wireless links to access nodes or different networks. The network interfaces 2006 allow the processing unit 2002 to communicate with remote units via the networks. For example, the network interfaces 2006 may provide wireless communication via one or more transmitters/transmit antennas and one or more receivers/receive antennas. In an embodiment, the processing unit 2002 is coupled to a local-area network 2022 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a configuring unit/module, an activating unit/module, a commanding unit/module, an instructing unit/module, a measuring unit/module, a reference signal triggering unit/module, a cell activation triggering unit/module, an acknowledging unit/module, a determining unit/module, and/or a communicating unit/module. The respective units/modules may be hardware, software, or a combination thereof. For instance, one or more of the units/modules may be an integrated circuit, such as field programmable gate arrays (FPGAs) or application-specific integrated circuits (ASICs).

It is further contemplated that the embodiments of the present disclosure can be implemented in a variety of means. For example, in some embodiments, a method is disclosed that contemplates means for sending a reference signal (RS) trigger triggering communication of a reference signal (RS) over a secondary cell (SCell) to be activated for the UE, means for communicating the temporary RS on the SCell, the RS configured for activation of the SCell, and means for receiving a report indicating that the SCell is activated for the UE.

The following references are related to the subject matter of the present disclosure, and are herein incorporated by reference in their entireties as if reproduced in full:

TS 38.213, V16.3.0 (2020-09), https://www.3gpp.org/ftp/Specs/2020-09/Rel-16/38_series/38213-g30.zip TS 38.321, V16.2.1 (2020-09), https://www.3gpp.org/ftp/Specs/2020-09/Rel-16/38_series/38321-g21.zip TS 38.133, V16.5.0 (2020-09), https://www.3gpp.org/ftp/Specs/2020-09/Rel-16/38_series/38133-g50.zip Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
  receiving, by a user equipment (UE) from a gNB, a secondary cell (SCell) activation command indicating the UE to activate a SCell for communications between the UE and the gNB on the SCell;
  receiving, by the UE, a reference signal (RS) on the SCell, wherein the RS is configured for fast activation of the SCell;
  performing, by the UE upon receiving the SCell activation command, SCell activation for activating the SCell based at least on the RS; and
  sending, by the UE to the gNB, a report indicating that the SCell is activated for the UE.

2. The method of claim 1, wherein the SCell activation command is received in an enhanced medium access control control element (MAC CE) on a first cell that was activated for serving the UE.

3. The method of claim 2, further comprising:
  receiving, by the UE, a command sent on the first cell, the command triggering the UE to receive the RS, and the command being included in the enhanced MAC CE.

4. The method of claim 3, wherein the RS is one of a set of RSs configured for fast activation of the SCell, and is indicated by the command.

5. The method of claim 1, wherein the RS is an aperiodic RS, and is triggered for receiving or received during activation of the SCell, and a slot in which the RS is sent is based on a slot in which the SCell activation command is sent and a slot offset value, the slot offset value configured for the RS and being in terms of a number of slots.

6. The method of claim 1, further comprising:
performing, by the UE based on the RS, at least one of automatic gain control (AGC) settling, frequency tracking, time tracking, or fine timing.

7. The method of claim 1, wherein the RS comprises at least a channel state information (CSI)-RS for tracking, which is a tracking reference signal (TRS) configured for the SCell.

8. The method of claim 7, wherein transmission of the RS comprises one or more transmissions of the TRS on one or more slots.

9. The method of claim 1, further comprising:
receiving, by the UE after receiving the RS, a channel state information-reference signal (CSI-RS) configured for the SCell.

10. The method of claim 9, wherein the CSI-RS is quasi co-located (QCLed) with the RS.

11. The method of claim 1, wherein the report comprises a CSI report based on a CSI measurement of a CSI-RS, the CSI report comprising a valid channel quality indicator (CQI) indicating that the SCell is activated.

12. The method of claim 1, further comprising:
sending, by the UE to the gNB, a message acknowledging receipt of the SCell activation command.

13. The method of claim 1, further comprising:
activating, by the UE, a bandwidth part (BWP) of the SCell associated with the RS.

14. The method of claim 1, wherein the report indicates that a BWP of the SCell associated with the RS is active.

15. A method comprising:
sending, by a gNB to a user equipment (UE), a secondary cell (SCell) activation command indicating the UE to activate an SCell for communications between the UE and the gNB on the SCell;
sending, by the gNB to the UE, a reference signal (RS) on the SCell to be activated by the UE, the RS configured for fast activation of the SCell; and
receiving, by the gNB from the UE in response to sending the SCell activation command and the RS, a report indicating that the SCell is activated for the UE.

16. The method of claim 15, wherein the SCell activation command is sent in an enhanced medium access control control element (MAC CE) on a first cell that was activated for serving the UE.

17. The method of claim 16, further comprising:
sending, by the gNB, a command on the first cell triggering the UE to receive the RS, the command being included in the enhanced MAC CE.

18. The method of claim 17, wherein the RS is one of a set of RSs configured for fast activation of the SCell, and is indicated by the command.

19. The method of claim 15, wherein the RS is an aperiodic RS and triggered/sent during activation of the SCell, and a slot in which the RS is sent is determined based on a slot in which the SCell activation command is sent and a slot offset value, the slot offset value configured for the RS and being in terms of a number of slots.

20. An apparatus comprising:
a non-transitory memory storage comprising instructions; and
one or more processors in communication with the non-transitory memory storage, wherein the instructions, when executed by the one or more processors, cause the apparatus to perform:
receiving, from a gNB, a secondary cell (SCell) activation command indicating to activate a SCell for communications between the apparatus and the gNB on the SCell;
receiving a reference signal (RS) on the SCell, wherein the RS is configured for fast activation of the SCell;
performing, upon receiving the SCell activation command, SCell activation for activating the SCell based at least on the RS; and
sending, to the gNB, a report indicating that the SCell is activated for the apparatus.

\* \* \* \* \*

UNITED STATES PATENT AND TRADEMARK OFFICE
CERTIFICATE OF CORRECTION

| | | |
|---|---|---|
| PATENT NO. | : 12,476,771 B2 | Page 1 of 1 |
| APPLICATION NO. | : 18/295092 | |
| DATED | : November 18, 2025 | |
| INVENTOR(S) | : Liu et al. | |

It is certified that error appears in the above-identified patent and that said Letters Patent is hereby corrected as shown below:

In the Claims

In Column 42, in Claim 1, Line 43, delete "a SCell" and insert -- an SCell --.

In Column 44, in Claim 20, Line 29, delete "a SCell" and insert -- an SCell --.

Signed and Sealed this
Thirtieth Day of December, 2025

John A. Squires
*Director of the United States Patent and Trademark Office*